US007153205B2

(12) United States Patent
Baerlocher

(10) Patent No.: US 7,153,205 B2
(45) Date of Patent: Dec. 26, 2006

(54) GAMING DEVICE HAVING RELATED MULTI-GAME BONUS SCHEME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 349 days.

(21) Appl. No.: 10/662,496

(22) Filed: Sep. 15, 2003

(65) Prior Publication Data

US 2004/0152500 A1 Aug. 5, 2004

Related U.S. Application Data

(62) Division of application No. 09/688,972, filed on Oct. 16, 2000, now Pat. No. 6,634,943.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/16; 463/20

(58) Field of Classification Search ............. 463/16–21
See application file for complete search history.

(56) References Cited

U.S. PATENT DOCUMENTS 4,448,419 A 5/1984 Telnaes
4,582,324 A 4/1986 Koza et al.
4,624,459 A 11/1986 Kaufman
4,695,053 A 9/1987 Vazquez, Jr. et al.
5,342,047 A 8/1994 Heidel et al.
5,456,465 A 10/1995 Durham
5,524,888 A 6/1996 Heidel
5,542,669 A 8/1996 Charron et al.
5,766,074 A * 6/1998 Cannon et al. ............... 463/16
5,775,692 A 7/1998 Watts et al.
5,833,537 A 11/1998 Barrie
5,931,467 A 8/1999 Kamille
5,951,397 A 9/1999 Dickinson
5,967,894 A 10/1999 Kimoshita et al.
5,980,384 A 11/1999 Barrie
5,996,997 A * 12/1999 Kamille ...................... 273/139
5,997,401 A 12/1999 Crawford (Continued)

FOREIGN PATENT DOCUMENTS

EP 0874337 A1 10/1998

(Continued)

OTHER PUBLICATIONS

Fortune Cookie Brochure, written by IGT, published in 2000.

(Continued)

*Primary Examiner*—Corbett B. Coburn
*Assistant Examiner*—Jasson Yoo
(74) *Attorney, Agent, or Firm*—Bell, Boyd & Lloyd, LLC

(57) ABSTRACT

A gaming device and method having a multi-game bonus scheme. The gaming device includes a controller, a device for providing a plurality of bonus games related by a plurality of bonus picks and a display device adapted to exhibit at least the bonus games and the bonus picks. Preferably the bonus picks are used in each bonus game. The gaming device includes an advancement ladder exhibited by the display device, wherein the advancement ladder includes at least start, ready and go blocks which must be reached before the player is awarded bonus values. In one embodiment, the bonus game includes a plurality of selections including at an eliminator selection and at least three other selections. When the eliminator selection is picked, one of the other selections is eliminated, and the remaining selections are available to be picked.

40 Claims, 24 Drawing Sheets

U.S. PATENT DOCUMENTS

| | | | |
|---|---|---|---|
| 6,012,982 | A | 1/2000 | Piechowiak et al. |
| 6,015,346 | A | 1/2000 | Bennett |
| 6,059,289 | A | 5/2000 | Vancura |
| 6,062,980 | A | 5/2000 | Luciano |
| 6,102,798 | A | 8/2000 | Bennett |
| 6,126,542 | A | 10/2000 | Fier |
| 6,142,875 | A | 11/2000 | Kodachi |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,174,233 | B1 | 1/2001 | Sunaga et al. |
| 6,174,235 | B1 | 1/2001 | Walker |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,224,483 | B1 | 5/2001 | Mayeroff |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,261,177 | B1 | 7/2001 | Bennett |
| 6,309,300 | B1 | 10/2001 | Glavich |
| 6,312,334 | B1 | 11/2001 | Yoseloff |
| 6,315,664 | B1 | 11/2001 | Baerlocher et al. |
| 6,346,043 | B1 | 2/2002 | Colin et al. |
| 6,347,996 | B1 | 2/2002 | Gilmore et al. |
| 6,375,187 | B1 | 4/2002 | Baerlocher |
| 6,394,902 | B1 | 5/2002 | Glavich et al. |
| 6,398,218 | B1 | 6/2002 | Vancura |
| 6,413,160 | B1 | 7/2002 | Vancura |
| 6,413,161 | B1 | 7/2002 | Baerlocher et al. |
| 6,413,162 | B1 | 7/2002 | Baerlocher et al. |
| 6,491,584 | B1 | 12/2002 | Graham et al. |
| 6,511,375 | B1 | 1/2003 | Kaminkow |
| 6,514,141 | B1 | 2/2003 | Kaminkow et al. |
| 6,547,242 | B1 | 4/2003 | Sugiyama et al. |
| 6,607,437 | B1 | 8/2003 | Casey et al. |
| 6,607,438 | B1 | 8/2003 | Baerlocher et al. |
| 2002/0025844 | A1 | 2/2002 | Casey et al. |

FOREIGN PATENT DOCUMENTS

| | | | | |
|---|---|---|---|---|
| EP | 0945837 | A2 | | 3/1999 |
| EP | 0981119 | A2 | | 2/2000 |
| EP | 0984409 | A2 | | 3/2000 |
| GB | 2144644 | A | | 3/1985 |
| GB | 2147773 | A | * | 5/1985 |
| GB | 2333880 | A | * | 8/1999 |
| WO | WO00/12186 | | | 3/2000 |

OTHER PUBLICATIONS

Pyramid Article, written by Strictly Slots, published Apr. 2001.
Richard Petty Brochure (and decription), written by IGT, published in 2000, undated.
Odyssey Article, written by Silicon Gaming, published in 2001.
Draw Poker "Held" Message, written by IGT, undated.
Dick Clark Brochure and Article (and description), written by IGT, published in 2000, undated.
Star Spangled Keno Gaming Machine Description, written by IGT, undated.
Jackpot Party Brochures and Articles, written by WMS Gaming Inc., published in 1998 and 2001.
Pink Panther, written by IGT, published in 2000.
Lifestyles of the Rich and Famous, written by IGT, published in 2003.

* cited by examiner

GAMING DEVICE HAVING RELATED MULTI-GAME BONUS SCHEME

PRIORITY CLAIM

This application is a divisional of and claims the benefit of U.S. patent application Ser. No. 09/688,972, filed Oct. 16, 2000, now U.S. Pat. No. 6,634,943, the contents of which are incorporated in its entirety herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a related multi-game bonus scheme.

BACKGROUND OF THE INVENTION

Gaming machines currently exist with mechanical or video reels having symbols thereon and bonus schemes in which a player has one or more opportunities to choose a particular symbol from a group of masked symbols to receive credit or bonus values. When the player chooses a masked award from a pattern or group of symbols, the game removes the mask and either awards the player with a bonus value or terminates the bonus round with a bonus terminator. The outcome depends upon whether the player selects an award or a terminator.

In the above game, the controller of the gaming device randomly places a predetermined number of masked awards and terminators in the pattern at the beginning of the bonus round and maintains the positioning until the bonus round terminates. When the player selects a masked award, the player receives the value of the award, and the game typically displays a message that the player may continue and enables the player to select another masked award. The player then selects another masked award, and the process continues until the player selects a masked terminator. European Patent Application No. EP 0 945 837 A2 filed on Mar. 18, 1999 and assigned on its face to WMS Gaming, Inc. discloses a bonus round of this type.

Many gaming devices include various other bonus schemes. Some gaming devices include multiple bonus schemes or round. However, these schemes are generally unrelated, or are not partially or wholly dependent on one another. Since players seek more entertainment and enjoyment, it is desirable to provide players with gaming devices with new bonus schemes.

SUMMARY OF THE INVENTION

The present invention provides a gaming device and method which includes related or linked bonus games or schemes. The bonus scheme of the present invention provides players with a predetermined number of player picks which are used in the related bonus games to gain advancement or bonus awards.

In one embodiment, the game includes a plurality of bonus games, where the number of games corresponds to the number of player picks. That is, the player uses one pick in each bonus game. Each game of the bonus round has one game scheme as discussed in greater detail below. Each game is selected from a plurality of game schemes. The player uses one of the player's picks in each bonus game, wherein each game provides a player with a plurality of selections. The selections may be credits or other functions such as advances, pick agains, selection eliminators or modifiers. When a player makes a selection in each bonus game, the game exhibits the credit or function associated with the selection using a display device. As long as the player has picks remaining, the game enables the player to make another selection. This process continues until the player ultimately uses all of the player's picks. In the preferred embodiment, the game provides audio, video or audio-video displays or exhibitions to the player based on each of the player's selections or upon the occurrence of each event during the bonus round. These exhibitions are dependant on the outcome of each selection.

It is therefore an object of the present invention to provide a gaming device with a multi-game bonus scheme.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
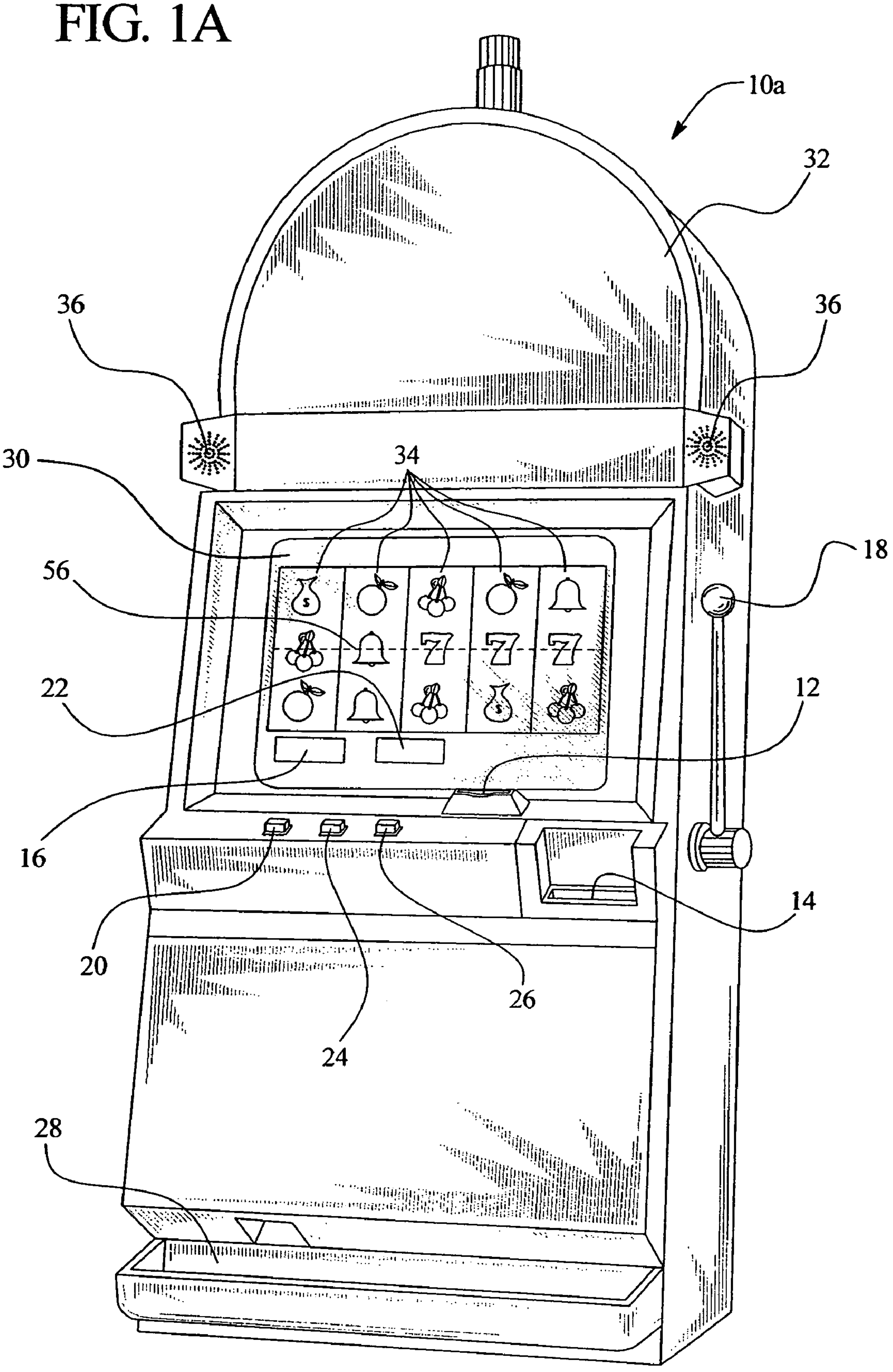
FIGS. 1A and 1B are perspective views of two alternative embodiments of the gaming device of the present invention.
Figure 1B:
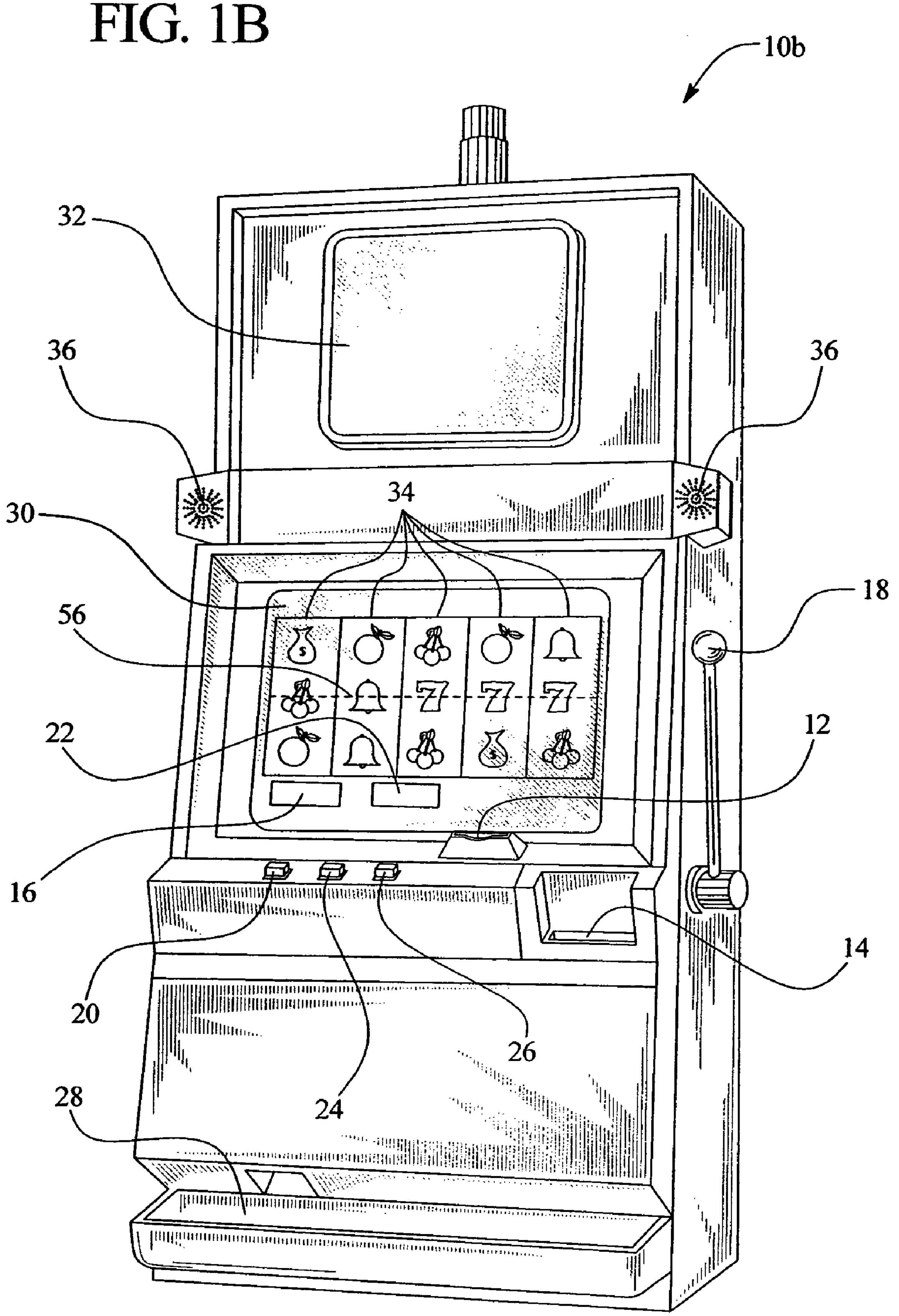

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
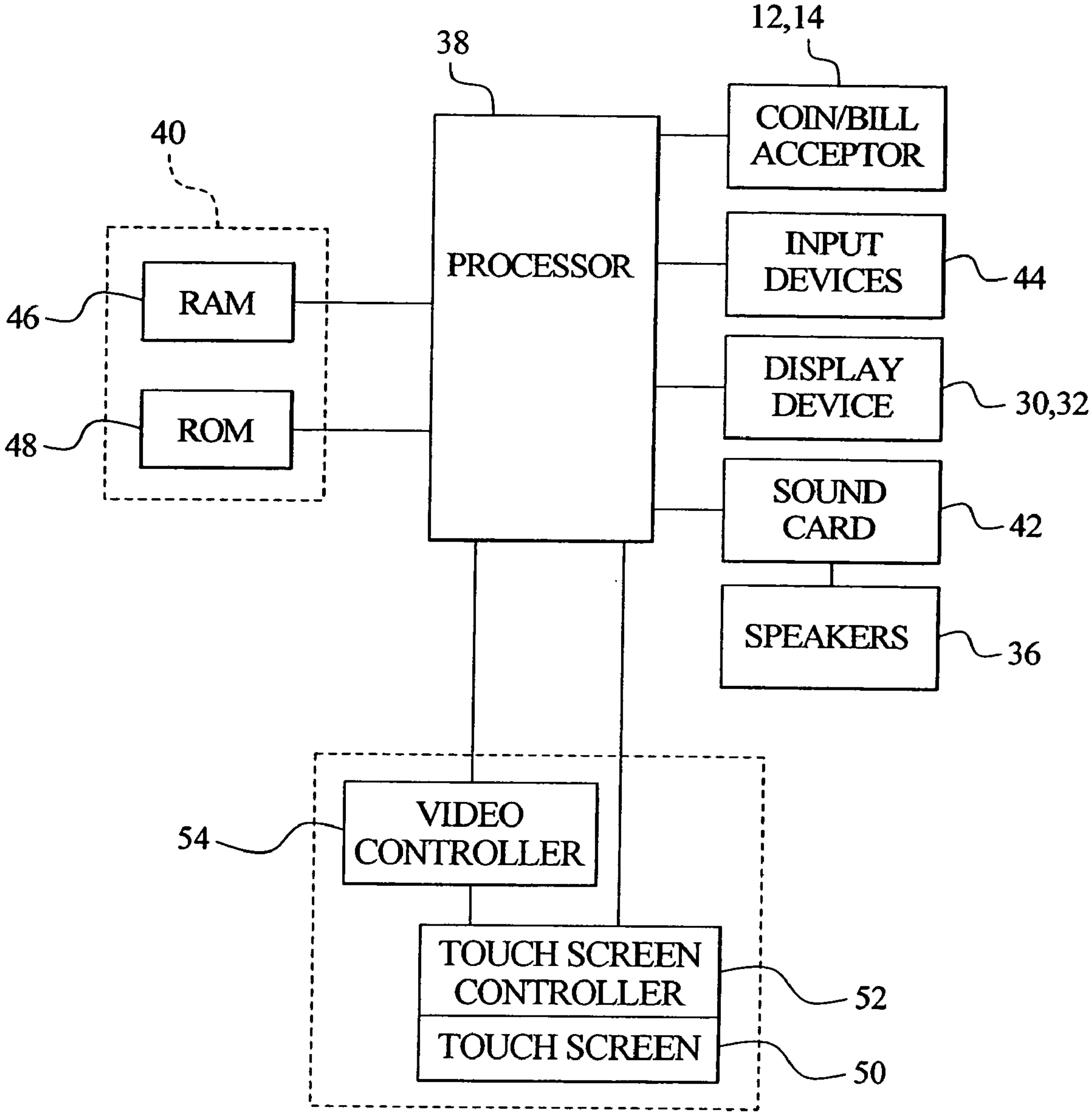
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Multiple Game Bonus Scheme

The present invention provides a multi-game bonus scheme which includes a plurality of related games. The games are related by at least one feature or function. In one preferred embodiment, a plurality of games are related by a number of picks provided to the player which the player uses in all of the related bonus games. In one preferred embodiment, the number of games is equal to the number of player picks such that the player has at least one pick in each game. Each bonus game has at least one game scheme such as an eliminator bonus game wherein the gaming device 10 eliminates one or more selections (preferably the selections having the lowest credit values) as discussed in detail below; a pick again bonus game which enables a player to make another selection to advance or earn credit or bonus values without using a player pick; and an ultimate pick bonus game, which enables a player to make a selection and decide whether to keep the symbol associated with that selection or make another selection with the chance of gaining greater credit or bonus values.

The gaming device, and specifically the controller, selects plurality of bonus games for each bonus round. The bonus games can be provided in predetermined order or in a randomly determined order for play by the player. It should be appreciated that other bonus games could be employed in conjunction with the present invention and that other functional symbols may be provided in the bonus games such as extra player pick, lose a pick, earn double (or other multiplier) credits, go to top, bonus credits, etc.

Figure 3:
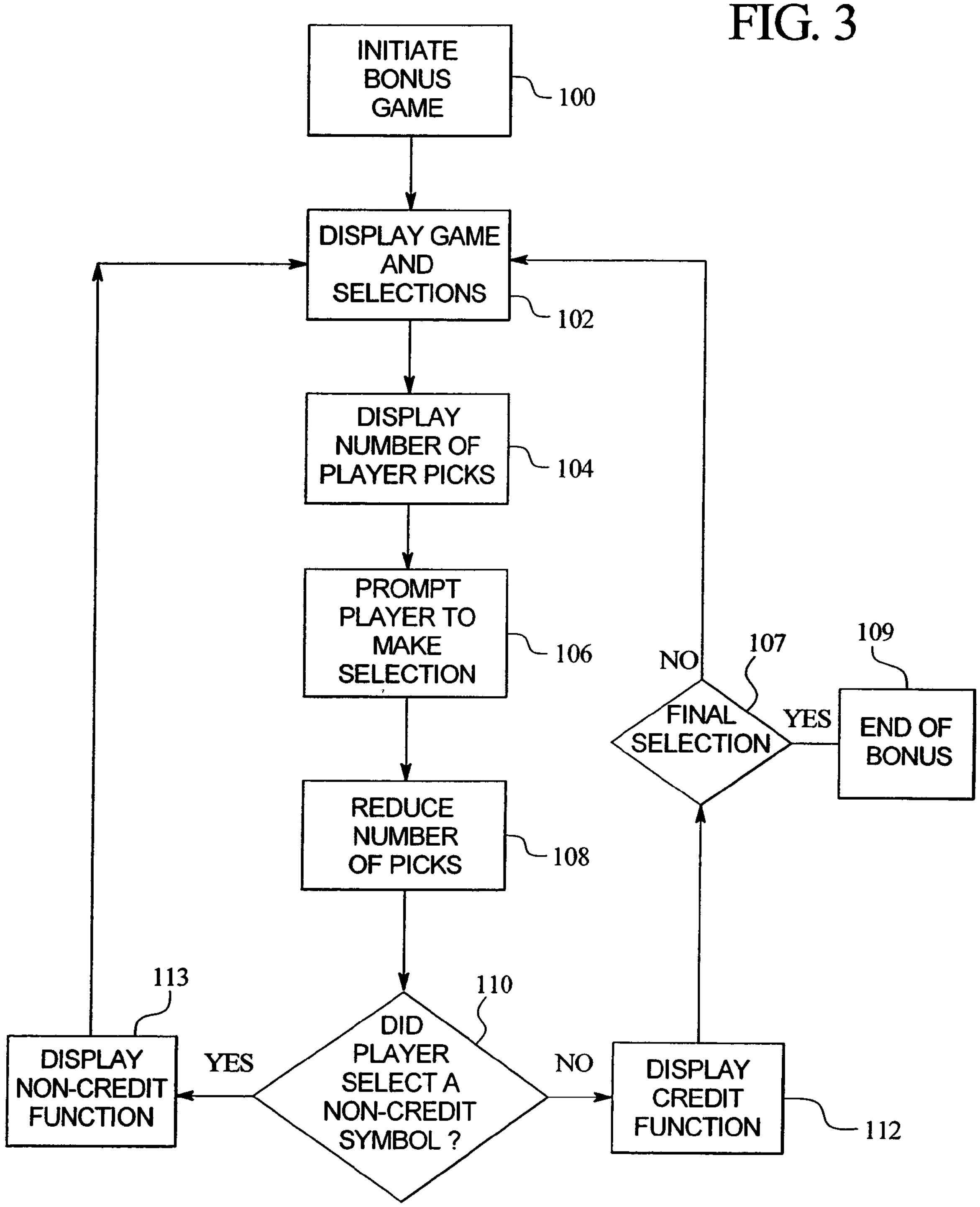
FIG. 3 is a flow diagram of one embodiment of the multi-game large award bonus scheme of the present invention.
Figure 4A:
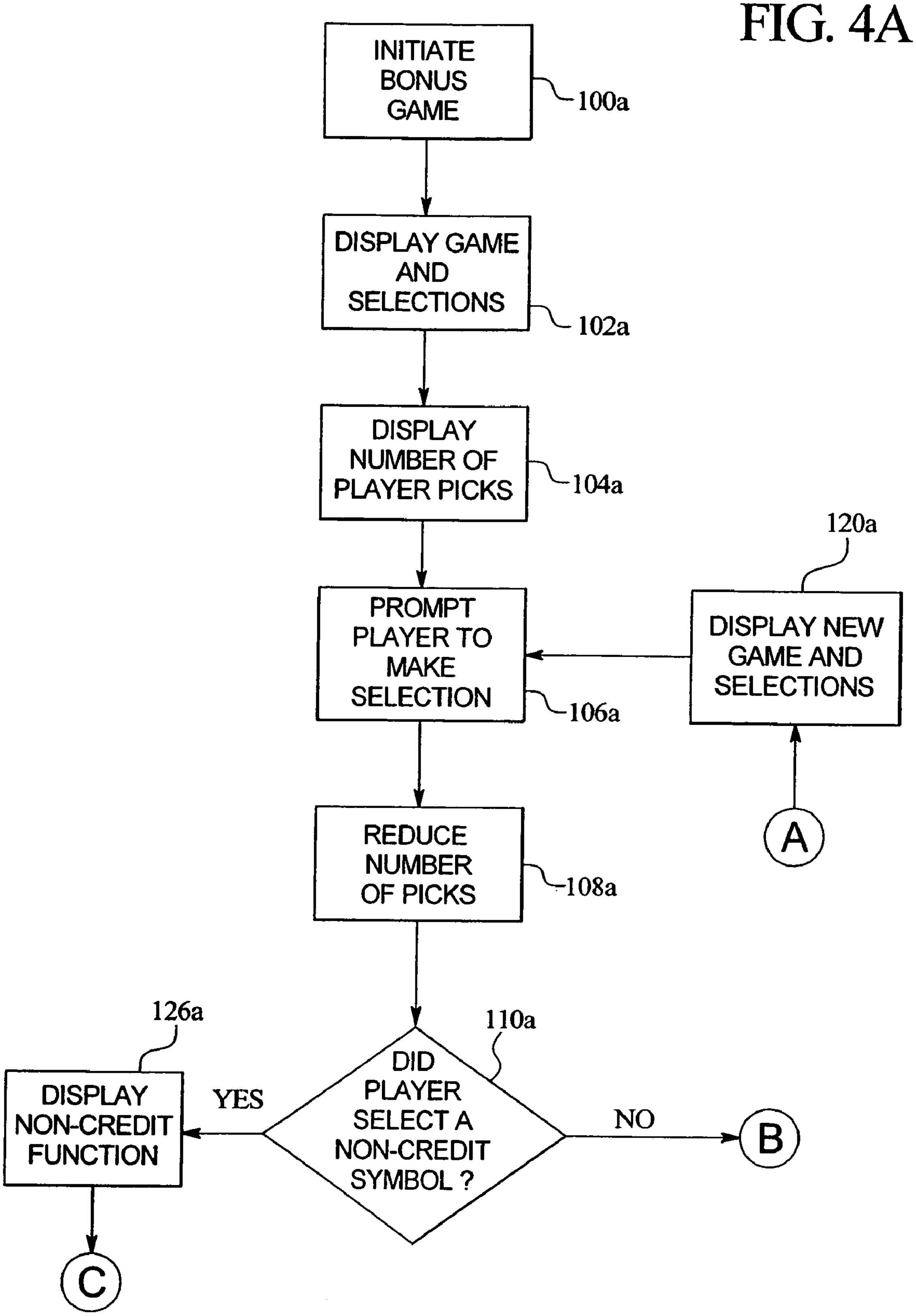
FIGS. 4A, 4B, 4C and 4D are flow diagrams of an alternative embodiments of the multi-game large award bonus scheme of the present invention.
Figure 4B:
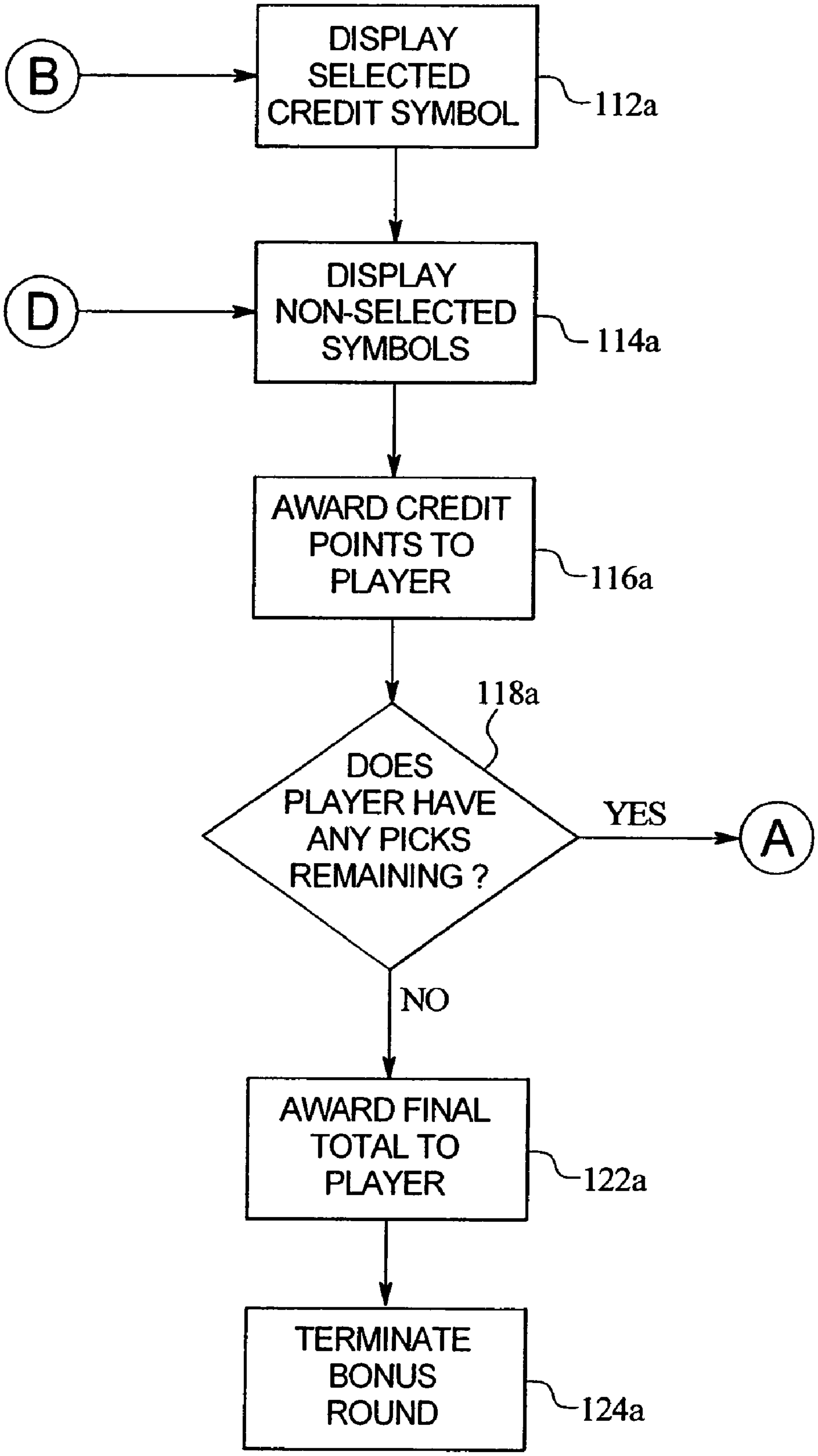
Figure 4C:
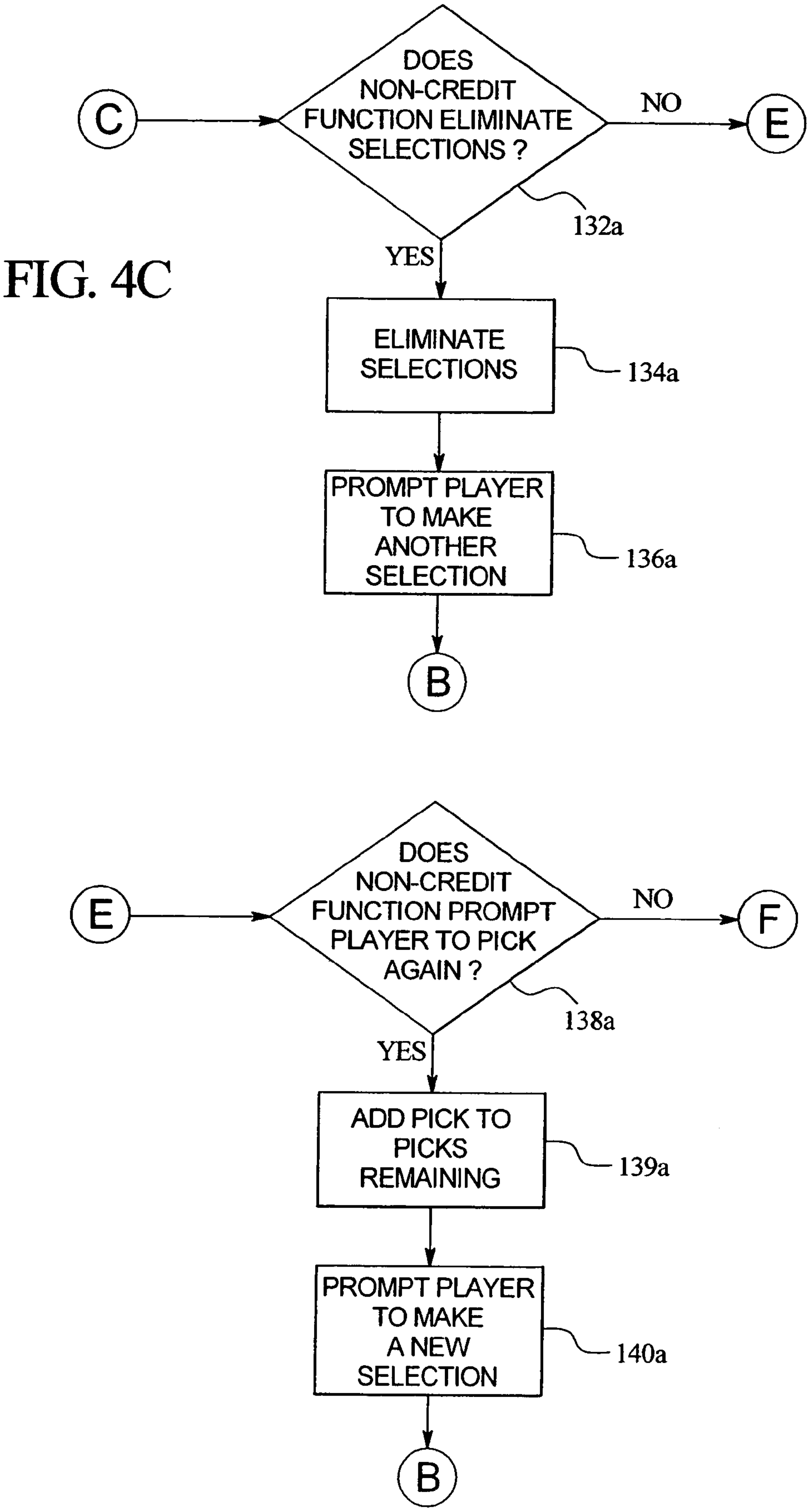
Figure 4D:
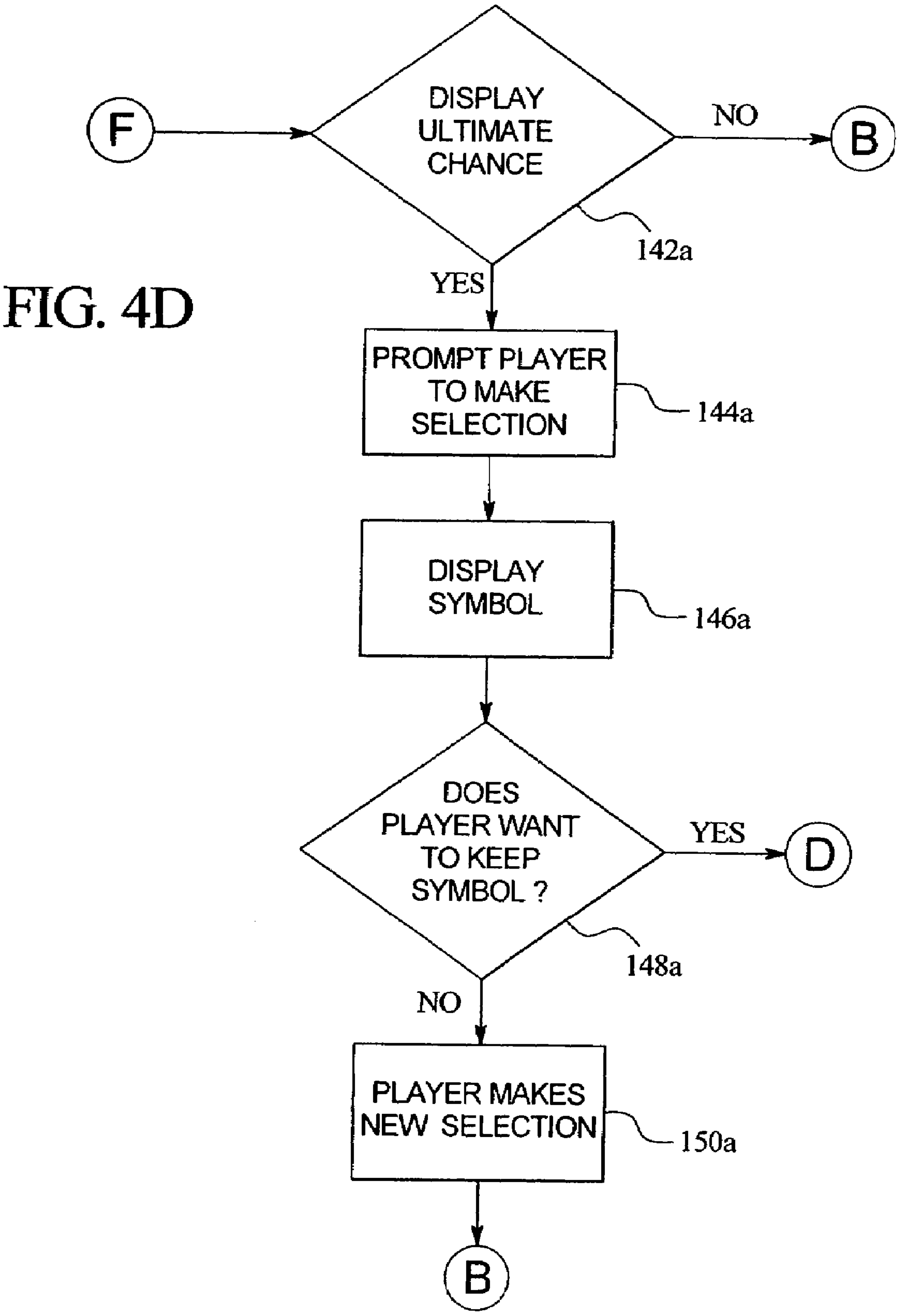
Figure 5A:
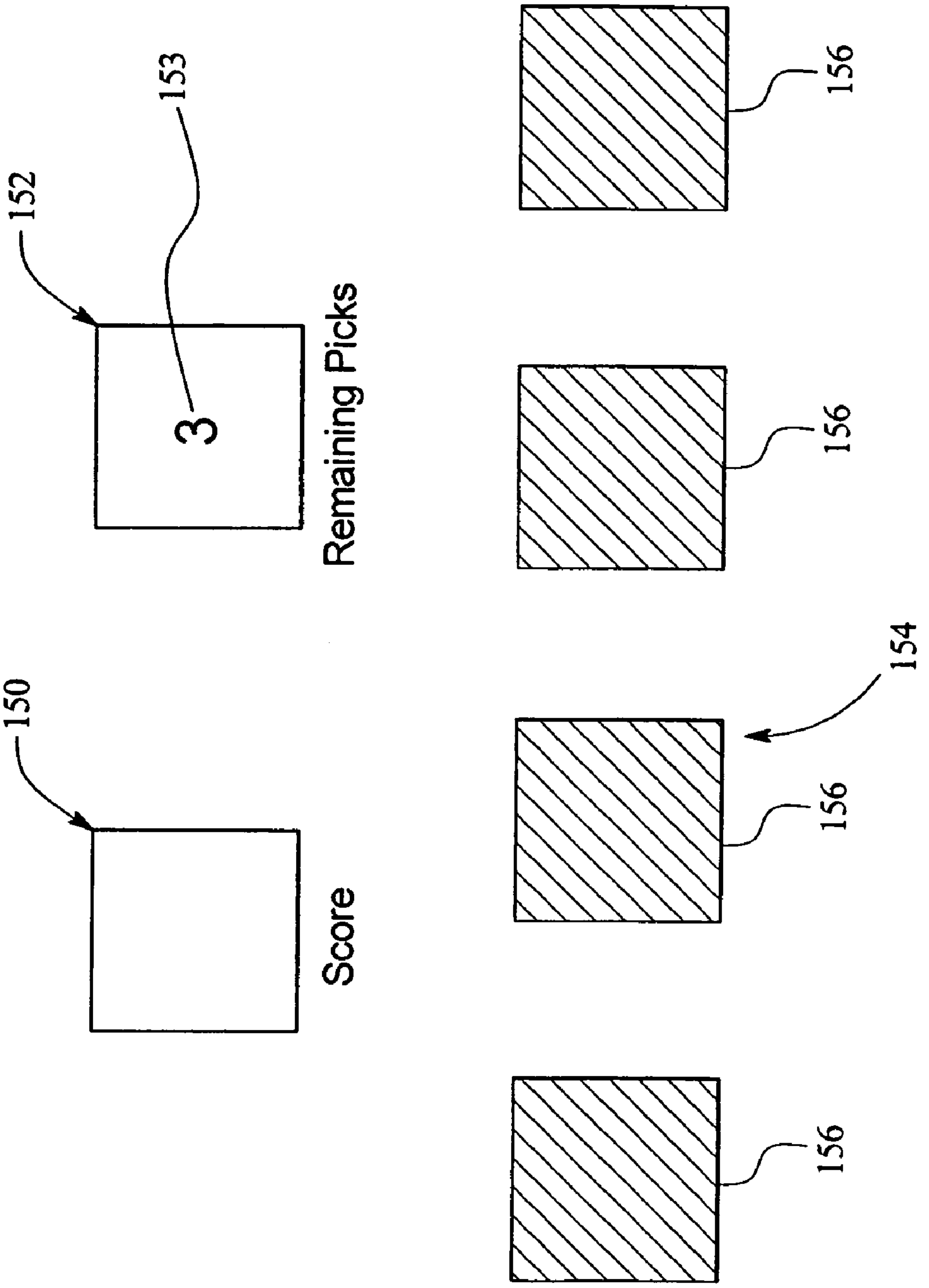
FIGS. 5A, 5B, 5C, 5D, 5E, 5F, 5G, 5H and 5I are top plan views of the display of one embodiment of the bonus scheme of the present invention.

Referring now to FIG. 3, if a player achieves a bonus triggering or qualifying condition when playing the primary game, the gaming device 10 automatically begins or initiates the bonus game of the present invention as indicated by block 100. The game displays the first bonus game, including a plurality of player selections using the display 30 or 32 as indicated by block 102. The selections are images consisting of various graphics and having various sizes, shapes and colors. In one embodiment of the present invention, the selections are squares in a linear format as illustrated in FIGS. 5A though 7C. It should be anticipated that the selections may be spaced apart in an orderly or disorderly arrangement or in any other suitable manner.

The game also preferably displays the number of player picks as indicated by block 104. In one preferred embodiment, the game awards the player with 4 player picks exhibited in a pick display 152. It should be appreciated that any possible number of player picks are contemplated. One alternative embodiment of the present invention provides a number of player picks based, at least in part, on the player's wager in the primary game. It should be appreciated that other methods are contemplated for determining the number of player picks, including the results in the primary game.

The gaming device prompts the player to make a selection in the first game as indicated by block 106. After reviewing the plurality of selections, the player chooses one selection, preferably by touching touch screen 50 (illustrated in FIG. 2). The gaming device 10 reduces or decrements the number of picks by one (displayed in the pick display) as indicated by block 108.

Each time a player makes a selection, the game exhibits the symbol associated with that selection. One symbol is associated with each selection. However, it should be appreciated that two or more symbols may be associated with each selection depending on the bonus game. In one preferred embodiment, the symbols are either credit symbols or functional or non-credit symbols. The game determines if the player selected a non-credit symbol as indicated by diamond 110.

If the player selected a credit symbol, the game displays the credit or bonus value(s) associated with that selection as indicated by block 112 using display 30 or 32. The game awards the credit or bonus value(s) to the player using the score display 150, then reveals the remaining non-selected symbols. The game then determines if the player made the final selection as indicated by diamond 107. If so, the bonus ends as indicated by block 109. If not, the game displays another bonus game as indicated by block 102. If the player selected a non-credit symbol, the game displays the non-credit symbol as indicated by block 113.

The gaming scheme determines whether this is the player's last pick or the game is the last bonus game. If not the last pick, the game displays another bonus game and selections as indicated by block 102, prompting the player to make another selection and the bonus round continues. This repeats until the bonus round is over. If the bonus round is over, the player's current total becomes the final total. This bonus round thereby provides a plurality of bonus games related by a plurality of player picks which are used in the various different bonus game.

It is anticipated that the credit symbols provide the player with credits, for example, 50, 100, 150, and 200 credits. However, the gaming scheme may use images that represent various points or other values. In one embodiment illustrated in FIGS. 5A through 7C, the gaming device 10 uses numerals 1 through 3 to represent different points, values, advancement (as discussed below) or credits. For example the credit symbol 3 may represent 150 credits, the credit symbol 2 may represent 100 credits and the credit symbol 1 may represent 50 credits.

A flow diagram illustrating an alternative embodiment of the present invention is illustrated in FIGS. 4A through 4D. Again, in this embodiment, the gaming device 10 automatically begins or initiates the bonus game of the present invention as indicated by block **100*a*. The game displays the bonus game and its plurality of selections using the display as indicated by block 102*a*. The game displays the number of player picks as indicated by block 104*a***.

The gaming device prompts the player to make a selection as indicated by block **106*a*. After reviewing the plurality of selections, the player chooses one selection. Again, the gaming device 10 reduces the number of picks by one (displayed in the pick display) as indicated by block 108*a***.

Each time a player makes a selection, the game exhibits the symbol associated with that selection. The game determines if the player selected a non-credit or functional symbol as indicated by diamond **110*a*. If the player selected a credit symbol, the game displays the credits or bonus values associated with that selection as indicated by block 112*a* using the display. The game reveals the remaining, non-selected symbols as indicated by block 114*a* and awards the credit or bonus values to the player using the score display as indicated by block 116*a***.

The gaming scheme determines whether this is the player's last pick (i.e., whether the player has any remaining picks) as indicated by diamond **118*a*. If this is not the player's last pick (i.e., the player has picks remaining), the game displays a new bonus game and selections as indicated by block 120***a*, prompting the player to make a selection as indicated by block 106*a*, and the bonus round continues. If the player does not have any picks remaining, the gaming scheme awards the final total to the player and the bonus game terminates as indicated by blocks 122*a* and 124*a*, respectively.

If the player picked a non-credit or functional symbol, the gaming device determines what non-credit symbol was selected, displaying the non-credit symbol as indicated by block 126*a*. In this embodiment the bonus game includes an eliminator selection or symbol. More particularly, the gaming device 10 determines, whether the player selected an eliminator symbol as indicated by diamond 132*a*. If the player selected an eliminator symbol, the gaming device 10 displays that symbol and eliminates one or more other selections as indicated by block 134*a*. This substantially improves the player's chance of receiving a greater or higher number advancement (as discussed below) or a higher credit value. In one preferred embodiment, the game reveals two credit symbols having the lowest credit values, substantially enhancing the player's chance of picking the higher-valued credit symbols. The game then prompts the player to make a selection as indicated by block 136*a* and then displays that symbol as indicated by block 112*a*.

In an alternative bonus game, if the player picked a non-credit or functional symbol, the game determines if the player selected a pick again symbol as indicated by diamond 138*a*. If the player selected a pick again symbol, the game adds a pick to the picks remaining as indicated by block 139*a*, displays the pick again symbol and prompts the player to make another selection as indicated by block 140*a*. The gaming scheme displays that symbol as indicated by block 112*a* and the bonus round continues.

In an alternative bonus game, if the player picked a non-credit or functional symbol, the game determines if the player selected an ultimate pick symbol as indicated by diamond 142*a*. If so, the game prompts the player to make another selection as indicated by block 144*a* and displays that symbol as indicated by block 146*a*. The game determines whether the player wishes to keep the newly selected symbol as indicated by diamond 148*a*. If the player decides to keep the new symbol, and the associated credit or bonus value, the player selects that symbol again, preferably using touch screen 50. The gaming device 10 reveals the remaining non-selected symbols as indicated by block 114*a* and continues as appropriate.

If, however, the player decides not to keep the newly selected symbol (i.e., the player decides to choose a new symbol) the player makes another selection as indicated by block 150*a*, again preferably using touch screen 50. The game displays the associated symbol as indicated by block 112*a* and continues as appropriate.

It should be appreciated that the gaming device 10 rearranges the symbols placement for each bonus game for each bonus round. It should be appreciated that the bonus game could be provided to the player in any alternative order, could be repeated, and the bonus round could include other related bonus games.

In one preferred embodiment, after each occurrence in the bonus round, an audio-visual display or exhibition is provided to the player based on or regarding the previous outcome and/or the upcoming selection. For example, in the eliminator bonus game, after the player selects an eliminator, the game provides an audio-video exhibition to the player that congratulates the player and informs the player what the game did based on the player's selection and what to do next. This exhibition keeps the player informed and entertains the player. Such exhibition can be revealed to the player after each selection or occurrence or only after certain selections or occurrences.

One embodiment of the bonus scheme is illustrated in FIGS. 5A through 5I. The scheme includes a plurality of display areas or displays preferably provided by display 32. The displays preferably include: (i) a score display 150, which exhibits the player's current credit or bonus values; (ii) a remaining picks 152 display, which exhibits the number of picks remaining to the player; and (iii) the selection display 154, which displays the selections 156 and different types of symbols 107.

Figure 5B:
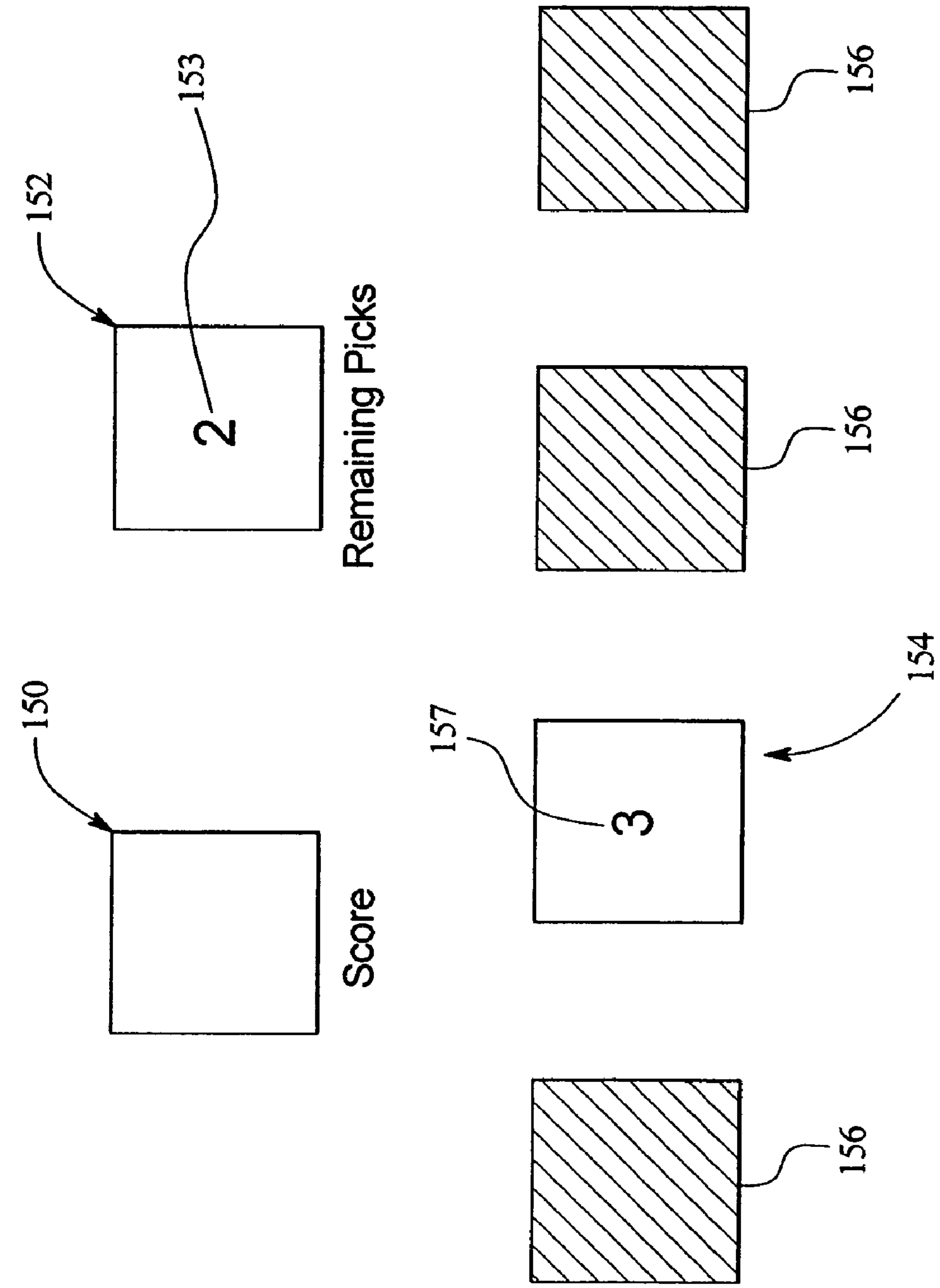
Figure 5C:
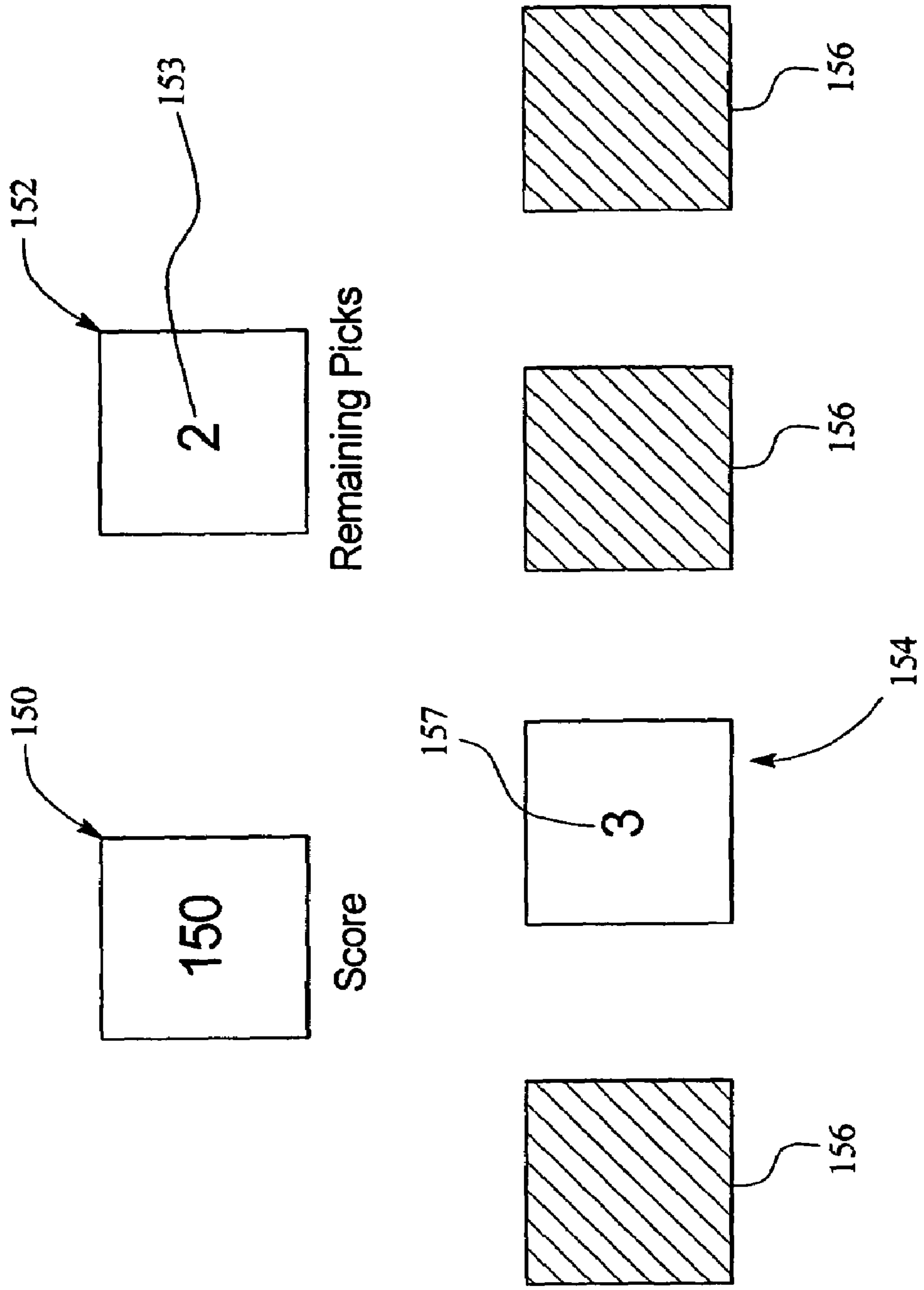
Figure 5D:
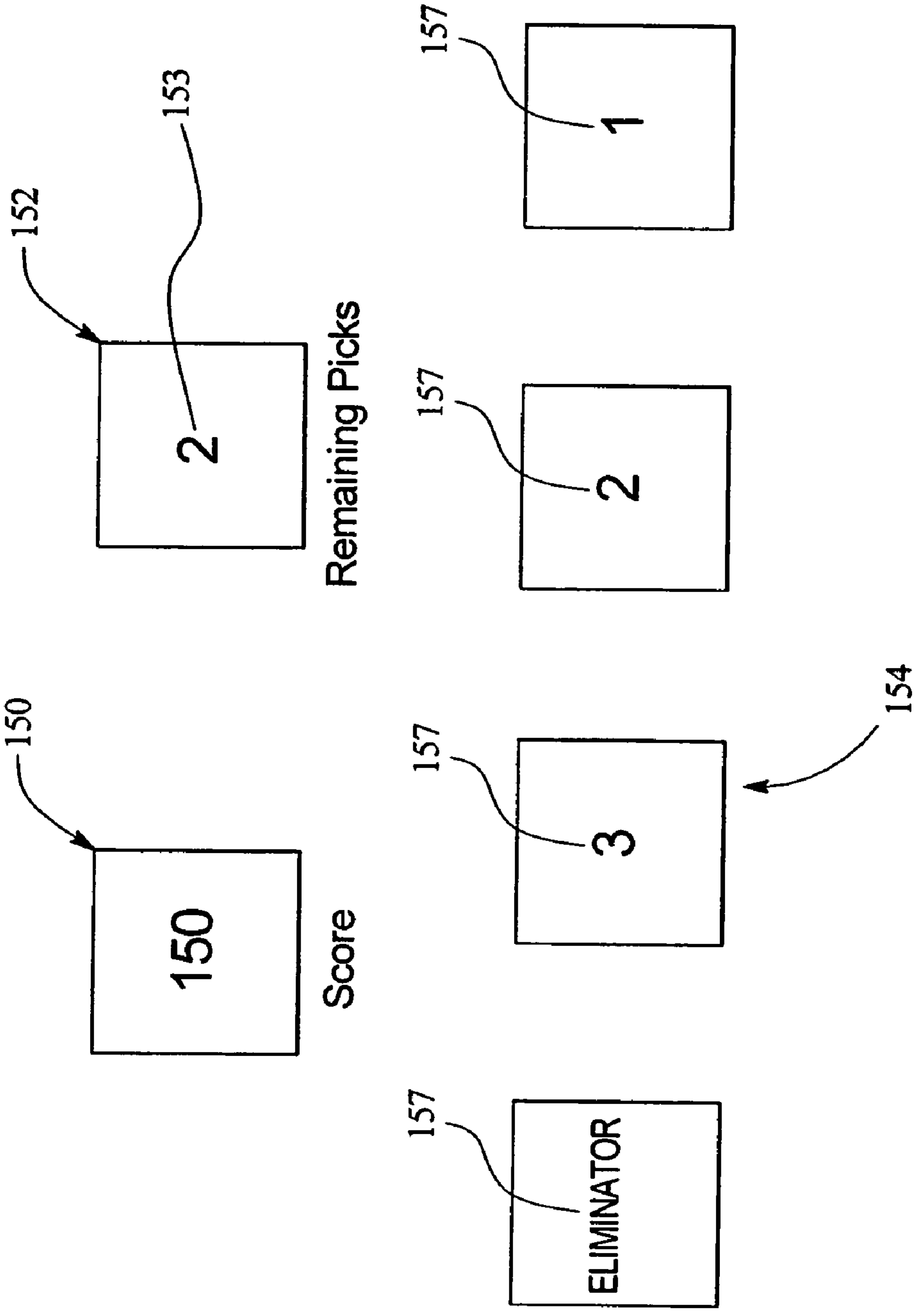

In this embodiment, the selection display 154 exhibits a plurality of selections 156 (4 total selections are displayed), displaying the plurality of selections in a linear manner. The player uses his first pick on one of the 4 selections 156, revealing the symbol 157 associated with that selection as illustrated in FIG. 5B. In this embodiment, the selected symbol is a 3 credit symbol associated with selection 156. The score display 150 provides the player's current score (i.e., 150 credit points or bonus value) and the pick display 152 displays the number of picks 153 remaining in this game (i.e., 2 picks) as illustrated in FIGS. 5B and 5C. The gaming device displays the remaining, non-selected, symbols 157 as illustrated in FIG. 5D.

Figure 5E:
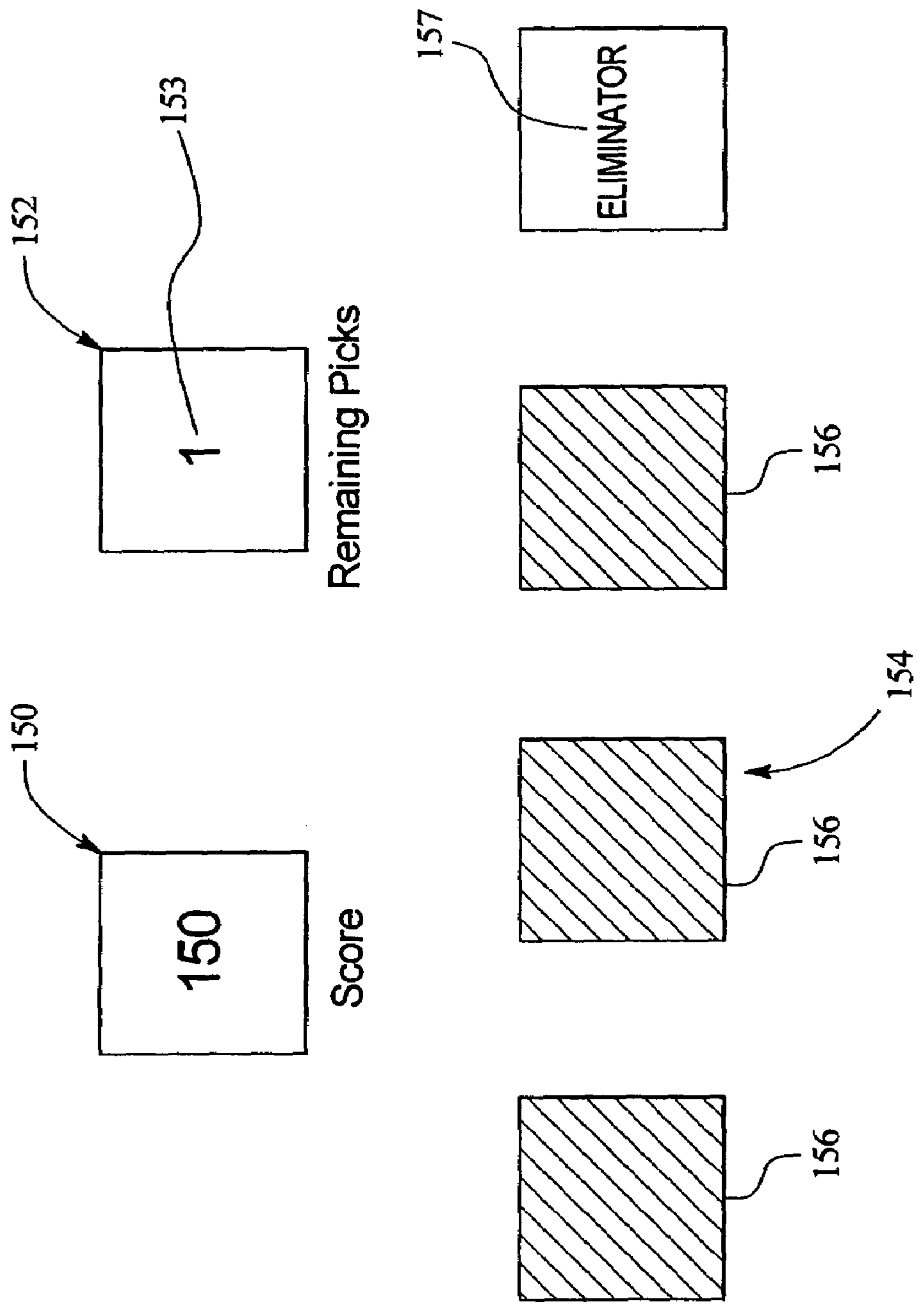
Figure 5F:
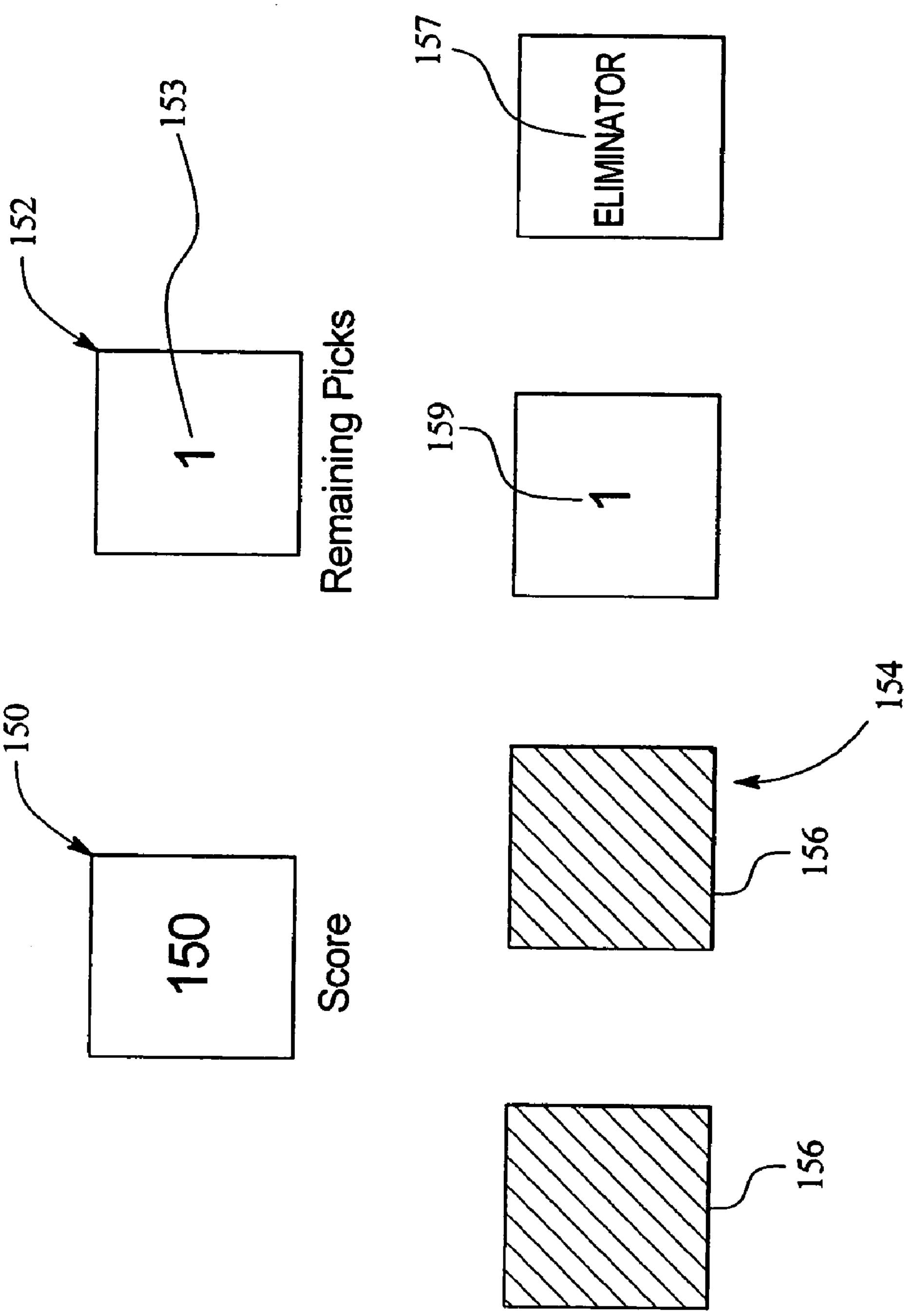
Figure 5G:
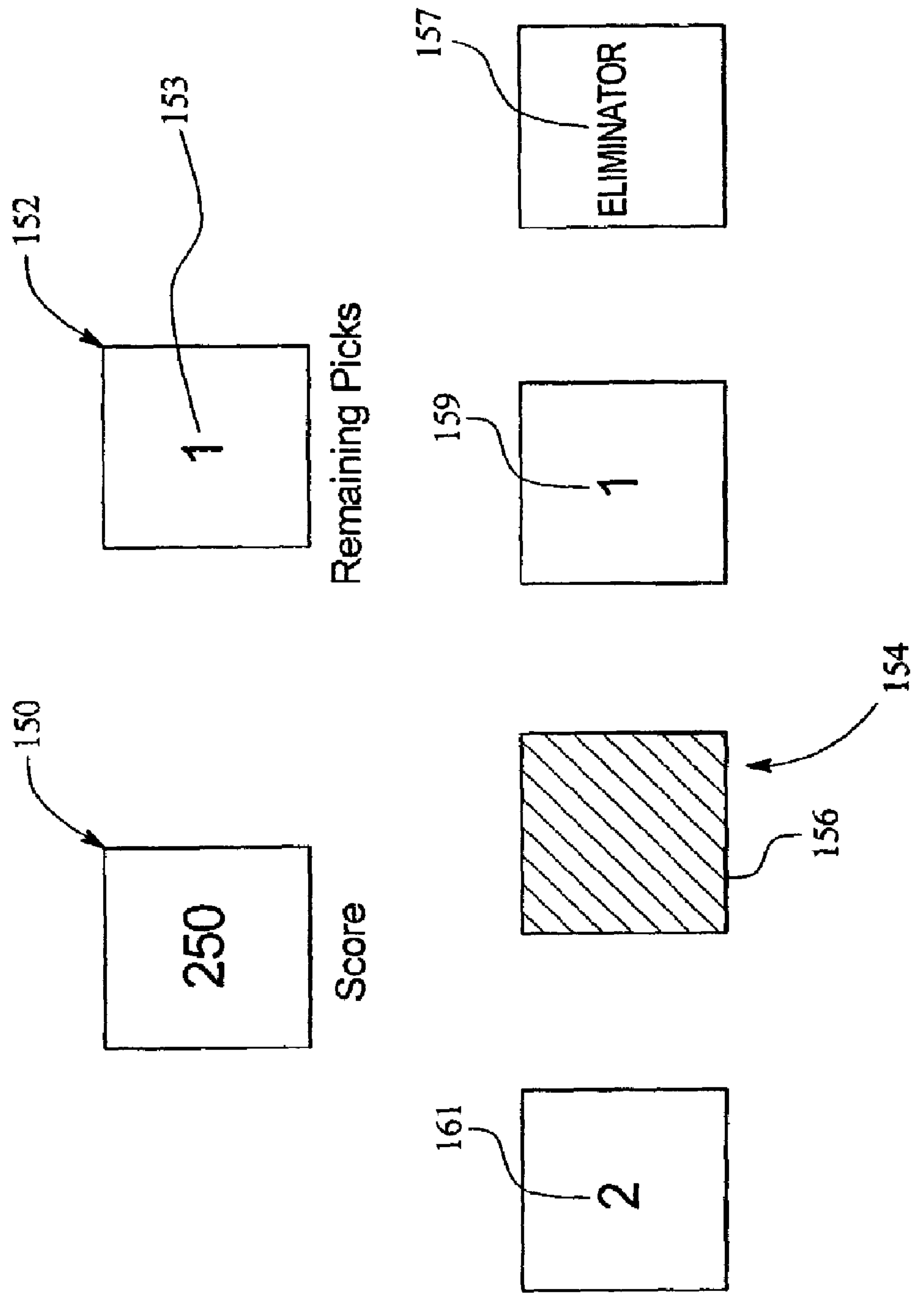

The bonus games are further illustrated in FIGS. 5E through 5I. In one eliminator game embodiment, the player selects an eliminator symbol 157 as illustrated in FIG. 5E. Gaming device 10 displays that symbol 157 and reveals one other symbol 159, eliminating that choice and improving the player's chance of receiving a higher score as illustrated in FIG. 5F. In one preferred embodiment, the game displays the symbols having the lowest credit points or values (here a 1 credit symbol). The game prompts the player to make another selection 156 and displays that symbol 161 as illustrated in FIG. 5G. The player's score and remaining number of picks 153 are updated as appropriate. It should be appreciated that the game can eliminate one or more selections, depending upon the number of selections.

Figure 5H:
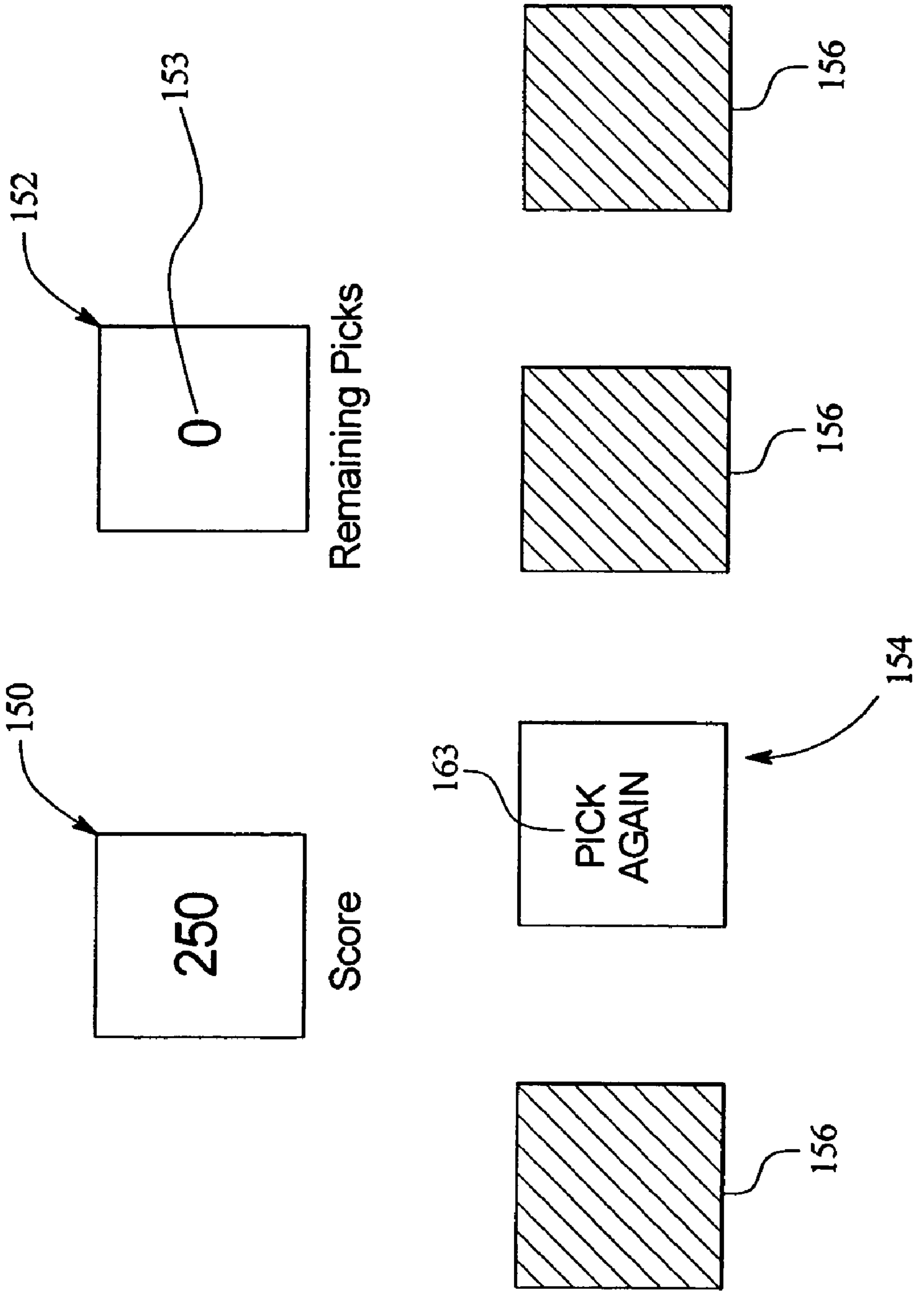
Figure 5I:
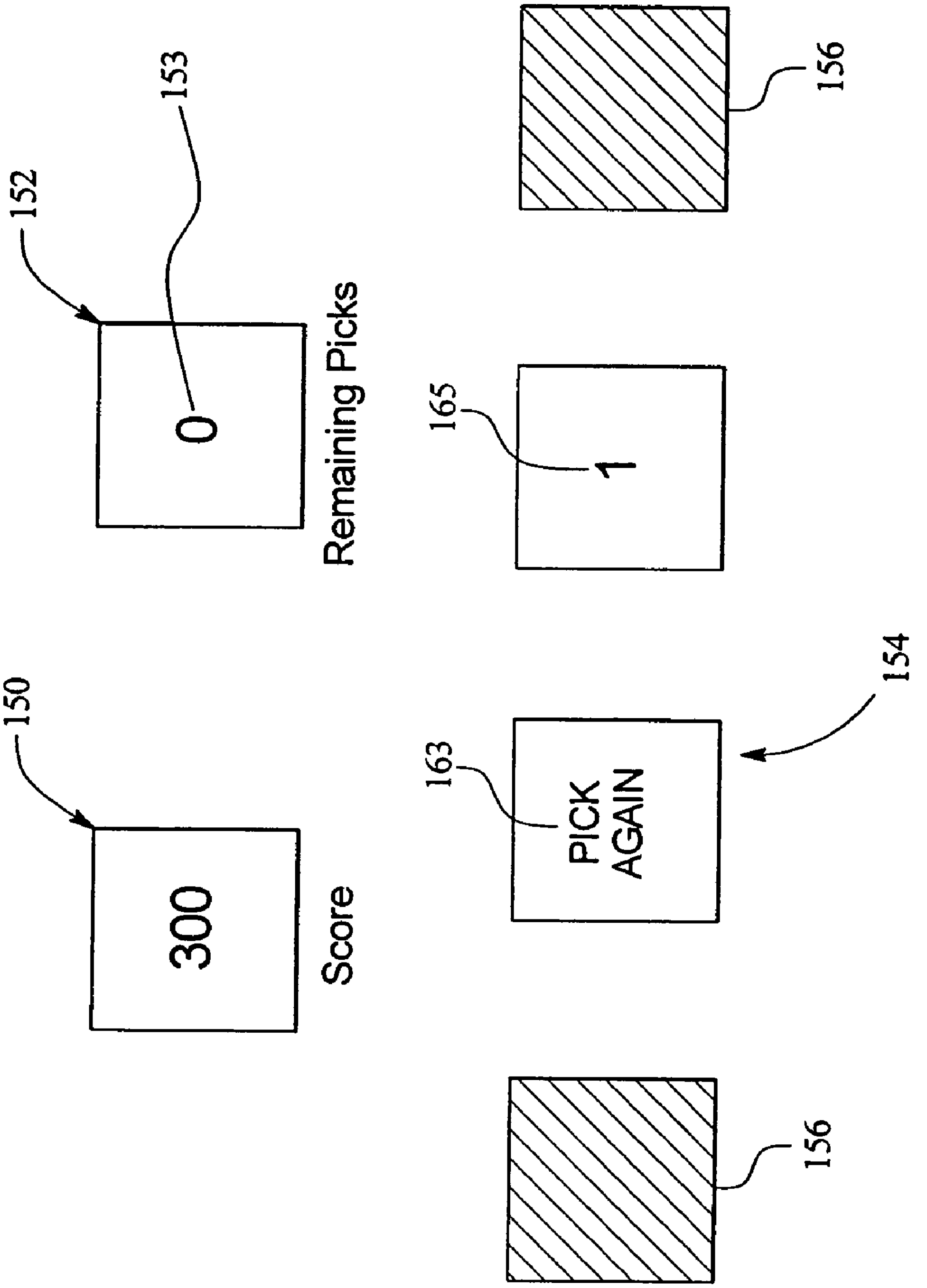

If the next bonus game is a pick again bonus game, the game 10 determines if the player selected a pick again symbol as discussed above. If the player selected a pick again symbol 163, the game displays the pick again symbol as illustrated in FIG. 5H and prompts the player to make another selection 156. The gaming scheme displays that symbol 165 as illustrated in FIG. 5I and updates the score and picks as indicated.

Figure 6A:
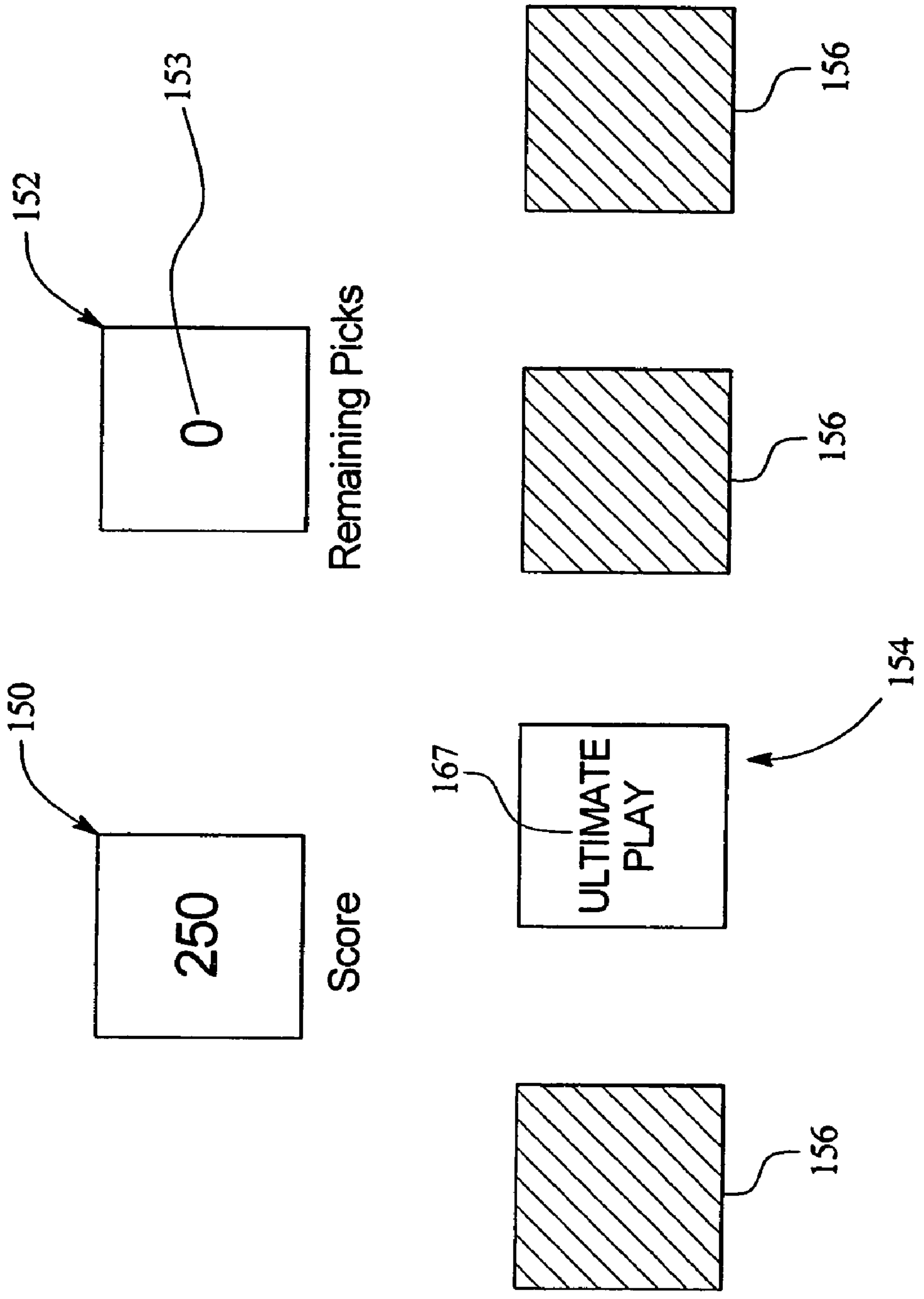
FIGS. 6A, 6B, 6C and 6D are top plan views of first alternative embodiment of the display of the bonus scheme.
Figure 6B:
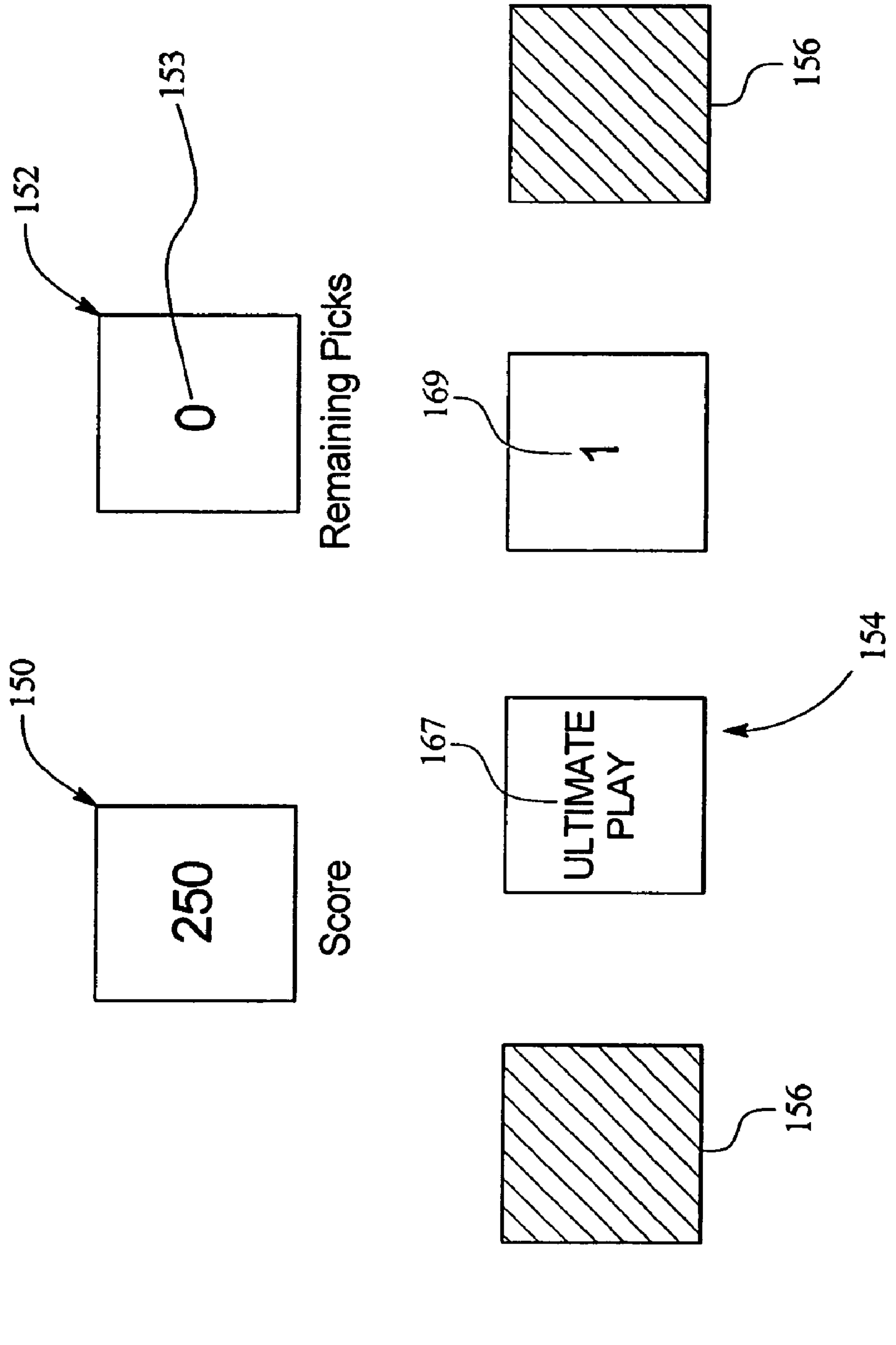
Figure 6C:
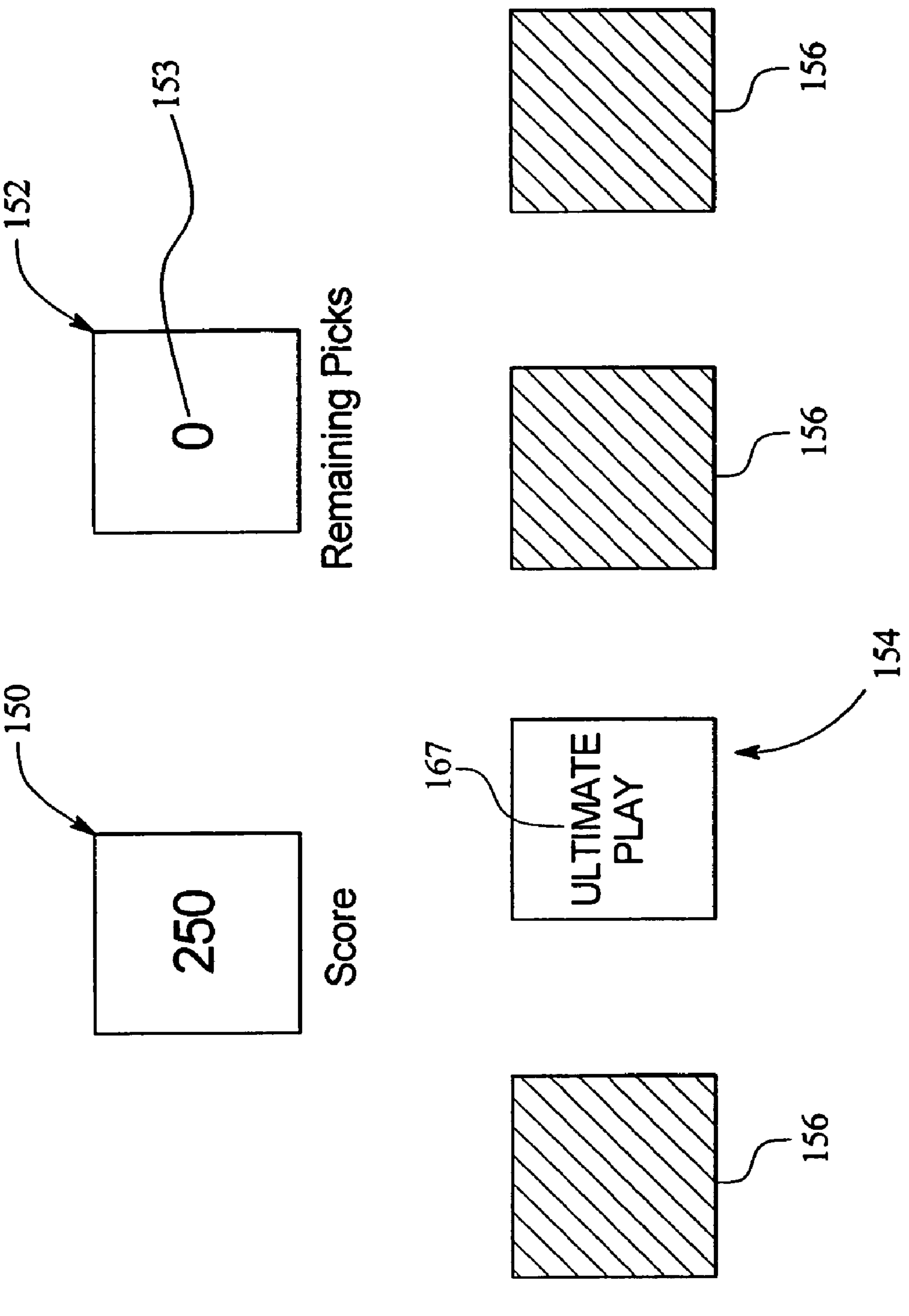

Yet another alternative bonus game is illustrated in FIGS. 6A through 6C. If player selects an ultimate pick symbol 167, as discussed previously and illustrated in FIG. 6A, the game prompts the player to make a selection and displays the associated symbol 169, as illustrated in FIG. 6B. The game determines whether the player wishes to keep the newly selected symbol, prompting the player to make a new selection if desired. If the player decides to keep the symbol 169, and the associated credit or bonus value, the player selects that symbol 169 again, preferably using touch screen 50. The gaming device 10 displays the remaining non-selected symbols and continues as appropriate.

Figure 6D:
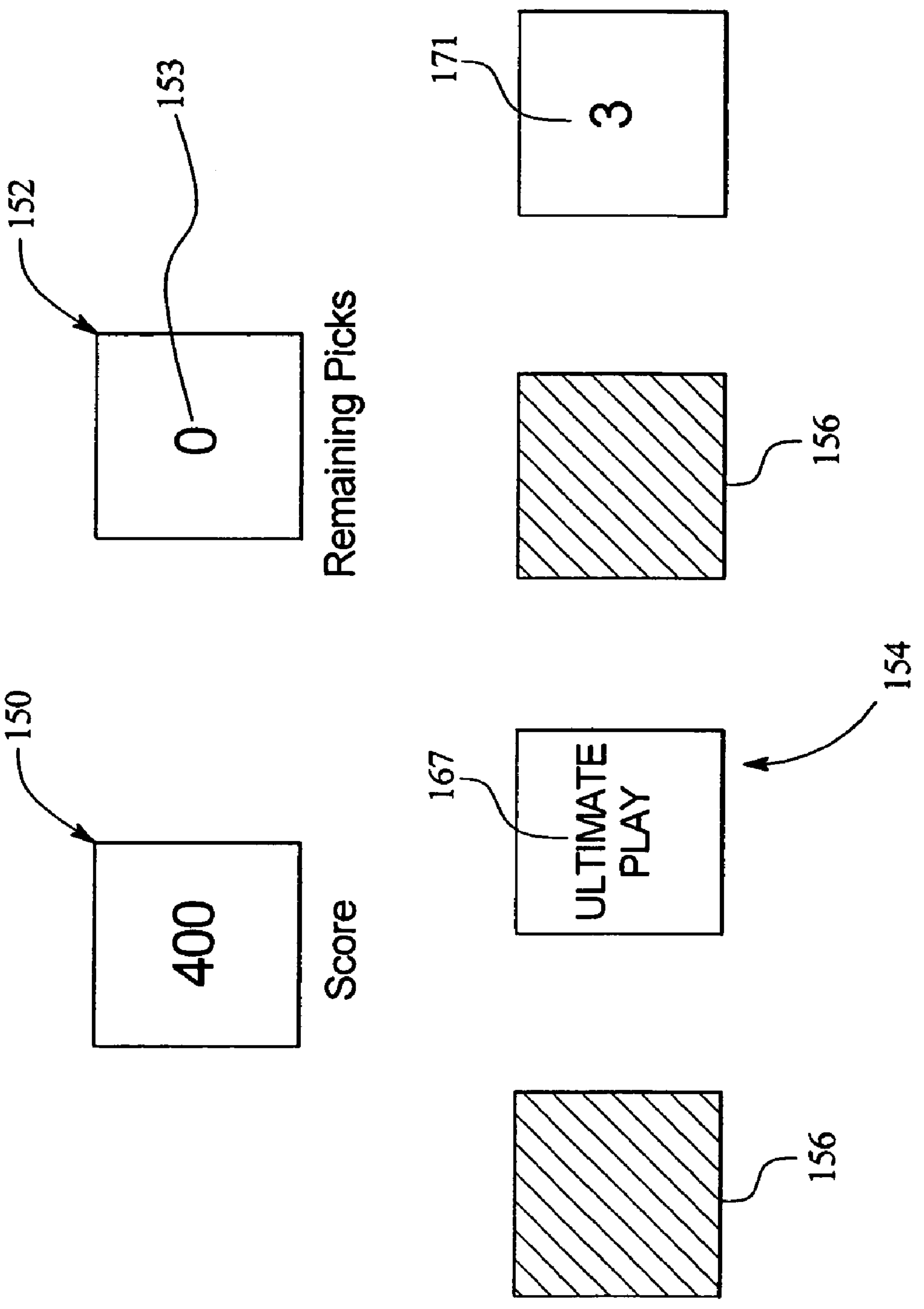

If, however, the player decides not to keep the newly selected symbol 169 (i.e., the player decides to choose a new symbol) the player makes another selection, again preferably using touch screen 50. The game recovers the first or old symbol 171 and displays the newly selected symbol 107 as illustrated in FIGS. 6C and 6D and continues as appropriate.

Figure 7A:
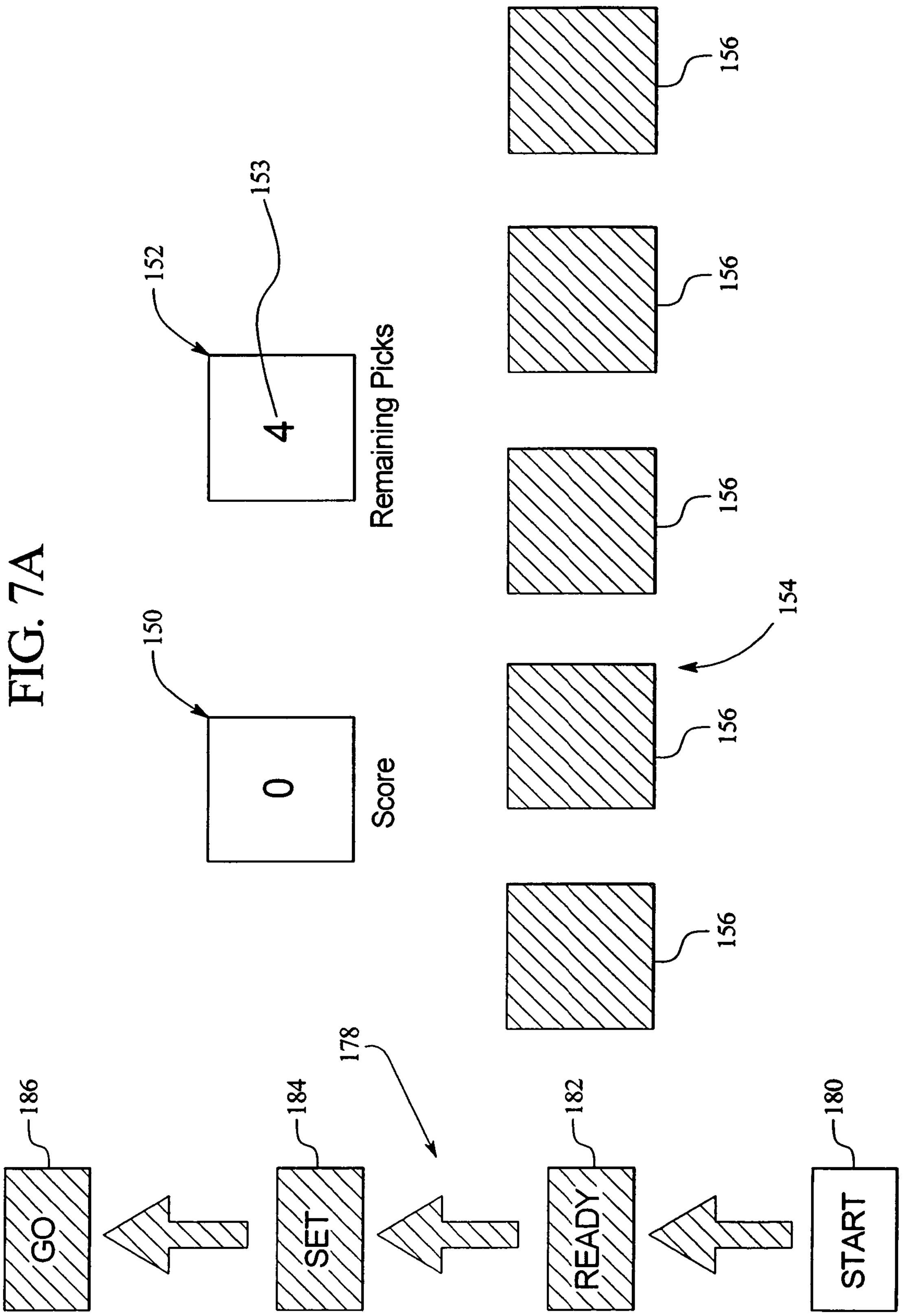
FIGS. 7A, 7B and 7C are top plan views of a second alternative embodiment of the display of the bonus scheme of the present invention.
Figure 7B:
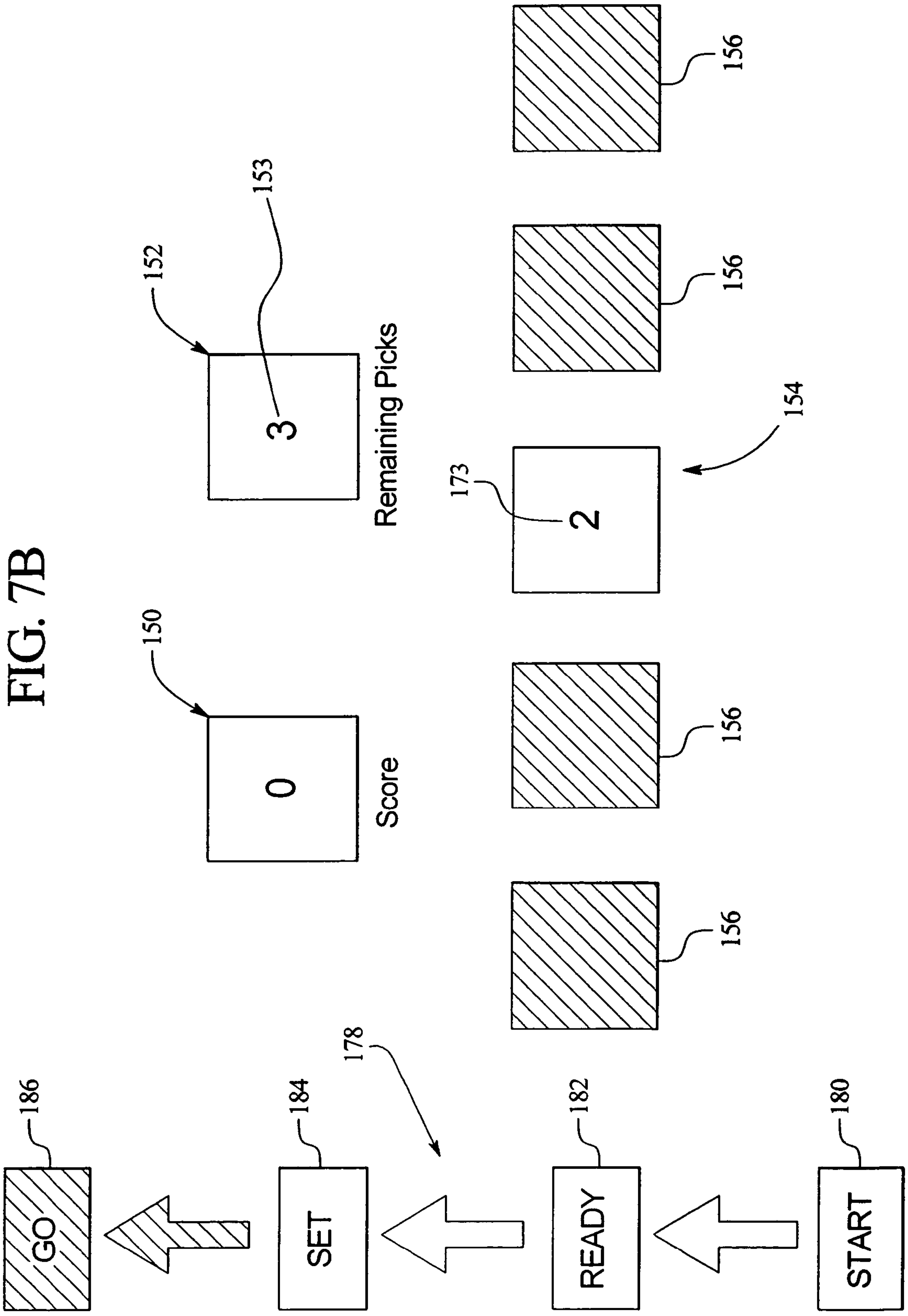
Figure 7C:
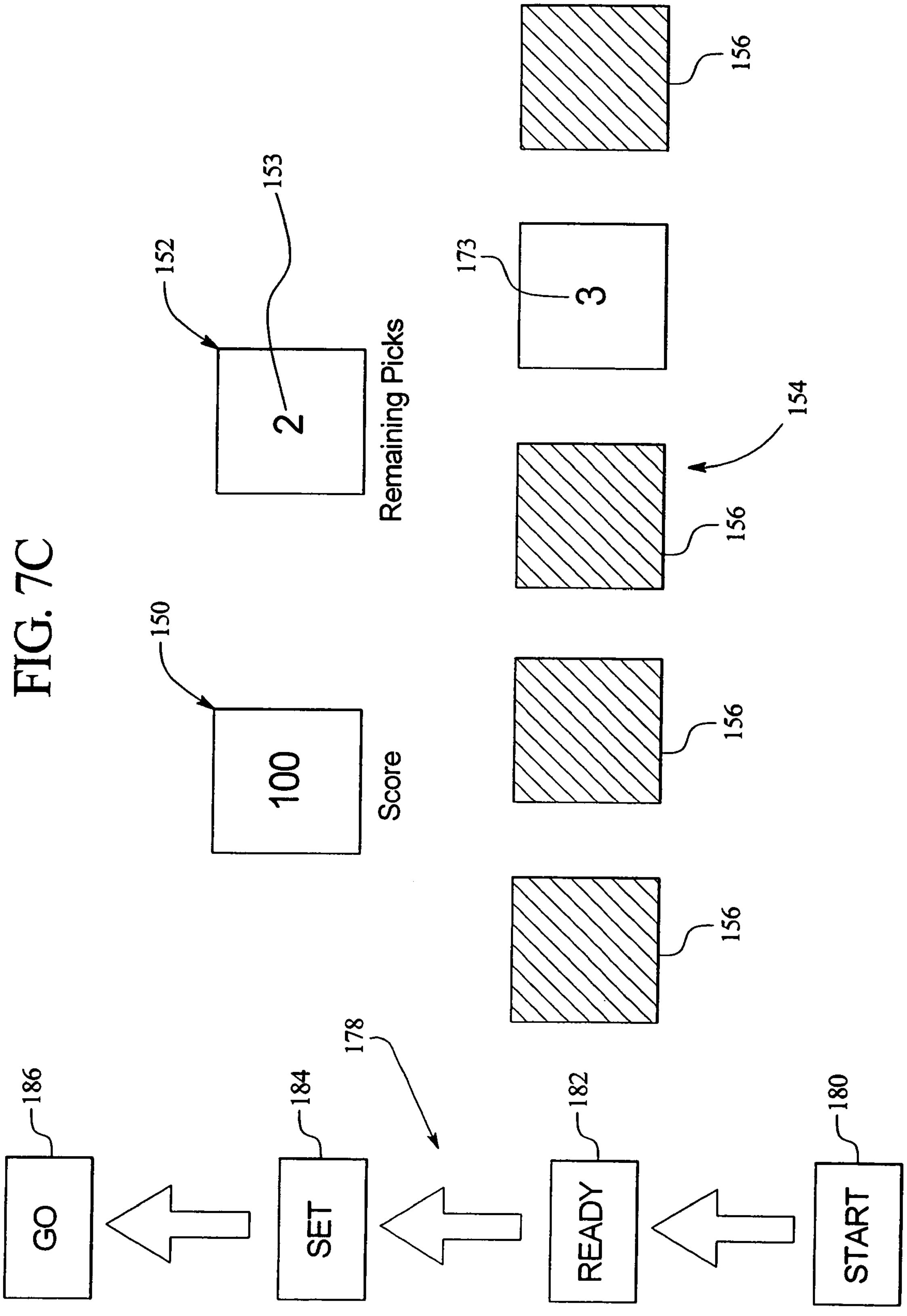

The present invention may also relate the bonus games by providing other embodiments of non-credit symbols associated with the selections as illustrated in FIGS. 7A through 7C. In this embodiment, selection display 154 exhibits a plurality of selections 156 (5 total selections are displayed). In this embodiment, the game 10 provides the player with 4 player picks 153 displayed in pick display 152. This embodiment differs from the previous embodiments, in that it includes an advancement ladder 178 including start block 180, ready block (and associated arrow) 182, set block (and associated arrow) 184 and go block 186, in addition to score display 150. In this embodiment, the player must advance up the ladder prior to earning any credits.

For example, the player starts at start block 180 which is highlighted as illustrated in FIG. 7A. The player chooses a selection 156 and associated symbol 173. Here, the player choose a 2 credit symbol as illustrated in FIG. 7B. The player then advances up the ladder two steps or blocks, from start 180 through ready 182 to set 184. The player doesn't earn any credit or bonus values until the player reaches the go block 186 as illustrated in FIG. 7C. It should be appreciated that any of the games described above, for example the eliminator, pick again or ultimate pick, among others, can be played in this embodiment. It is also anticipated that the gaming scheme provides for other non-credit symbols 154, including win game, lose a pick, lose bonus points, go to top, etc. The quicker the player gets to the go block 186, the quicker the player begins to receive credits with each selection. The symbols therefore act as advances until the player reaches a certain level. With each advancement, the game preferably provides the player an audio-video exhibition explaining the previous occurrence or the further possibilities.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of a processor, said gaming device comprising:

a base game operable upon a wager;

a triggering event associated with the base game;

a bonus game operable upon the occurrence of the triggering event, said bonus game including a plurality of selections, said selections including at least one eliminator selection and at least three other selections, wherein, after the eliminator selection is picked in a play of the bonus game, at least one of the other remaining unpicked and non-eliminated selections is picked by the processor to be eliminated in said play of the bonus game, and the remaining unpicked and non-eliminated selections are available to be subsequently picked in said play of the bonus game;

a display device adapted to display said selections, and, when one of the remaining unpicked and non-eliminated selections is picked to be eliminated in said play of the bonus game, to display an indication of said eliminated selection; and an outcome of the bonus game adapted to be provided to the player based on at least one of the selections other than the eliminator selection.

2. The gaming device of claim 1, which includes a plurality of outcomes, wherein one of said outcomes is associated with each of the other selections.

3. The gaming device of claim 2, wherein the outcomes include a plurality of awards, wherein one of said awards is associated with each of the other selections.

4. The gaming device of claim 3, wherein the eliminated selection includes the lowest one of the awards.

5. The gaming device of claim 1, wherein the other selections include at least four other selections, and after the eliminator selection is picked, two of the other remaining unpicked and non-eliminated selections are eliminated.

6. The gaming device of claim 1, wherein, after the eliminator selection is picked, all but at least two of the remaining unpicked and non-eliminated selections are eliminated.

7. The gaming device of claim 1, which includes an outcome associated with the eliminated selection, wherein said outcome includes a lowest value outcome.

8. The gaming device of claim 1, wherein the selections are player-selectable, and which includes at least one input device which enables the player to pick the selections.

9. The gaming device of claim 1, wherein the number of eliminated selections is based on the total number of selections and the number of eliminator selections.

10. The gaming device of claim 1, which includes a bonus round, wherein the bonus game is one of a plurality of bonus games, and wherein the outcomes associated with the selections include advances accumulated in the bonus round.

11. The gaming device of claim 10, which includes a designated award adapted to be provided to the player if the player accumulates a designated number of advances in the bonus round.

12. A gaming device comprising:

a game operable upon the occurrence of a triggering event, said game including a plurality of player-selectable selections, said selections including at least one eliminator selection and at least three other selections, wherein, after a player picks the eliminator selection in a play of the game, at least one of the other remaining unpicked and non-eliminated selections is picked to be eliminated in said play of the game, and the player is enabled to pick at least one of the remaining unpicked and non-eliminated selections available to be picked in said play of the game;

at least one input device adapted to enable the player to pick the selections;

a display device adapted to display said selections, and, when one of the remaining unpicked and non-eliminated selections is picked to be eliminated in said play of the game, to display an indication of said eliminated selection; and a plurality of outcomes, each outcome associated with one of the other selections other than the eliminator selection, wherein the outcome associated with the picked selection other than the eliminator selection is adapted to be provided to the player.

13. The gaming device of claim 12, wherein the outcomes include a plurality of awards, wherein one of said awards is associated with each of the other selections.

14. The gaming device of claim 12, wherein the eliminated selection has the lowest one of the awards.

15. The gaming device of claim 12, wherein the number of eliminated selections is based on the number of selections.

16. The gaming device of claim 12, wherein the outcomes associated with the selections include advances accumulated in the game.

17. The gaming device of claim 12, which includes a designated award adapted to be provided to the player if the player accumulates a designated number of advances in the game.

18. The gaming device of claim 12, wherein the game is one of a plurality of games, and includes a designated award adapted to be provided to the player if the player accumulates a designated number of advances in the games.

19. A gaming device comprising:

a game including at least one eliminator selection and at least three non-eliminator selections, wherein after the eliminator selection is picked in a play of the game, at least one of the other remaining unpicked and non-eliminated selections is picked to be eliminated in said play of the game, and the remaining unpicked and non-eliminated selections are available to be picked in said play of the game;

at least one advancement associated with at least one of the non-eliminator selections, wherein said advancement is accumulated if said advancement is associated with a picked non-eliminator selection;

a display device adapted to display said selections and advancements, and, when one of the remaining unpicked and non-eliminated selections is picked to be eliminated in said play of the game, to display an indication of said eliminated selection; and an award adapted to be provided to the player based on the accumulated number of advancements.

20. The gaming device of claim 19, wherein the award is provided to the player if a predetermined number of advancements are accumulated.

21. A method of operating a gaming device including a game operable upon a wager, said method comprising:

(a) displaying a plurality of selections;

(b) enabling a player to pick one of said selections;

(c) if the player picks an eliminator selection in a play of the game, after said eliminator selection is picked, picking at least one of the other remaining unpicked and non-eliminated selections to be eliminated from subsequently being picked in said play of the game, displaying an indication of the selection picked to be eliminated in said play of the game, and enabling the player to pick at least one of the remaining unpicked and non-eliminated selections in said play of the game; and (d) providing an outcome to the player based on at least one of the player-picked non-eliminator selections.

22. The method of claim 21, wherein the outcome associated with at least one of the player picked non-eliminator selections includes an award.

23. The method of claim 21, wherein the outcome associated with at least one of the player picked non-eliminator selections includes an advancement which is accumulated.

24. The method of claim 21, which includes eliminating the selection having the lowest value to the player.

25. The method of claim 21, wherein the steps of (a) to (d) are provided to the player through a data network.

26. The method of claim 25, wherein the data network is an internet.

27. A method of operating a gaming device having a game upon a wager, said method comprising:

(a) displaying a plurality of selections;

(b) enabling a player to pick at least one of said selections;

(c) if the player picks an eliminator selection in a play of the game, (i) after said eliminator selection is picked, picking at least one of the other remaining unpicked and non-eliminated selections to be eliminated from being picked in said play of the game, (ii) displaying an indication of the selection picked to be eliminated in said play of the game, and (iii) enabling the player to pick from the remaining unpicked and non-eliminated selections in said play of the game; and (d) providing to said player an advance associated with at least one of the remaining selections picked by the player, wherein an award is adapted to be provided to the player based on an accumulated number of advances.

28. The method of claim 27, which includes eliminating the selections having the lowest number of advances.

29. The method of claim 27, wherein the steps of (a) to (d) are provided to the player through a data network.

30. The method of claim 29, wherein the data network is an internet.

31. A gaming device operated under the control of a processor, said gaming device comprising:

a display device controlled by the processor;

a game displayed by the display device;

a plurality of selections in said game, said selections including at least one eliminator selection and at least three other selections, wherein, if the eliminator selection is picked in a play of the game, after said eliminator selection is picked, at least one of the other remaining unpicked and non-eliminated selections is picked by the processor to be eliminated from further selection in said play of said game, and at least one of the other remaining unpicked and non-eliminated selections is available to be subsequently picked in said play of the game, and the display device is adapted to display an indication of said eliminated selection; and an outcome of the game adapted to be provided to the player based on at least one of the picked other selections.

32. The gaming device of claim 31, which includes a plurality of outcomes, wherein one of said outcomes is associated with each of the other selections.

33. The gaming device of claim 32, wherein the outcomes include a plurality of awards, wherein one of said awards is associated with each of the other selections.

34. The gaming device of claim 33, wherein the eliminated selection includes one of the lowest value awards.

35. The gaming device of claim 31, wherein the other selections include at least four other selections, and after the eliminator selection is picked, two of the other remaining unpicked and non-eliminated selections are eliminated.

36. The gaming device of claim 31, wherein, after the eliminator selection is picked, all but at least two of the remaining unpicked and non-eliminated selections are eliminated.

37. The gaming device of claim 31, which includes an outcome associated with the eliminated selection, wherein said outcome includes lowest value outcomes.

38. The gaming device of claim 31, wherein the selections are player-selectable, and which includes at least one input device in communication with the processor and which enables the player to pick the selections.

39. The gaming device of claim 31, wherein the number of eliminated selections is based on the total number of selections and the number of eliminator selections.

40. A method of operating a gaming device including a game operable upon a wager, said method comprising:

(a) displaying a plurality of selections;

(b) causing a pick of at least one of said selections;

(c) if an eliminator selection is picked in a play of the game, (i) after said eliminator selection is picked, picking at least one of the other remaining unpicked and non-eliminated selections to be eliminated from subsequently being picked in said play of the game, (ii) displaying an indication of the selection picked to be eliminated in said play of the game, and (iii) causing a pick of at least one of the remaining unpicked and non-eliminated selections in said play of the game; and (d) providing an outcome to the player based on at least one of the picked selections.

* * * * *